United States Patent
Stafsudd et al.

(10) Patent No.: US 6,711,280 B2
(45) Date of Patent: Mar. 23, 2004

(54) METHOD AND APPARATUS FOR INTELLIGENT RANGING VIA IMAGE SUBTRACTION

(75) Inventors: Oscar M. Stafsudd, 2397 Nalin Dr., Los Angeles, CA (US) 90077-1806; Ioannis Kanellakopoulos, 10152 Firwood Dr., Cupertino, CA (US) 95014-2662; Phyllis R. Nelson, 6733 Mt Baldy Rd., Mt Baldy, CA (US) 91759; Nicholas Bambos, 2 Clark Dr., Apt. 314, San Mateo, CA (US) 94401

(73) Assignees: Oscar M. Stafsudd, Los Angeles, CA (US); Ioannis Kanellakopoulos, Cupertino, CA (US); Phyllis R. Nelson, Mt. Baldy, CA (US); Nicholas Bambos, San Mateo, CA (US)

( * ) Notice: Subject to any disclaimer, the term of this patent is extended or adjusted under 35 U.S.C. 154(b) by 0 days.

(21) Appl. No.: 09/866,072

(22) Filed: May 25, 2001

(65) Prior Publication Data

US 2002/0176605 A1 Nov. 28, 2002

(51) Int. Cl.[7] .................................................. G06R 9/00
(52) U.S. Cl. .................... 382/106; 382/194; 382/299; 382/260; 348/622; 359/385
(58) Field of Search ................................. 382/106, 194, 382/299, 260; 348/139, 622; 702/142, 157; 359/15, 196, 385; 340/903, 436; 356/4.04, 3, 5.11; 396/110

(56) References Cited

U.S. PATENT DOCUMENTS

| | | | | |
|---|---|---|---|---|
| 5,185,345 A | * | 2/1993 | Garcia et al. ................ | 514/302 |
| 5,237,130 A | | 8/1993 | Kulesza et al. | |
| 5,249,027 A | | 9/1993 | Mathur et al. | |
| 5,249,157 A | | 9/1993 | Taylor | |
| 5,381,095 A | | 1/1995 | Andrews | |
| 5,387,916 A | | 2/1995 | Cohn | |
| 5,416,711 A | | 5/1995 | Gran et al. | |
| 5,642,299 A | * | 6/1997 | Hardin et al. ................ | 702/142 |
| 5,673,082 A | * | 9/1997 | Wells et al. ................. | 348/139 |
| 5,801,881 A | * | 9/1998 | Lanni et al. ................. | 359/386 |
| 5,870,136 A | * | 2/1999 | Fuchs et al. .................. | 348/42 |
| 6,088,470 A | * | 7/2000 | Camus et al. ................ | 382/117 |
| 6,101,034 A | * | 8/2000 | Cox et al. .................... | 359/562 |
| 6,496,252 B1 | * | 12/2002 | Whiteley ..................... | 356/121 |
| 6,522,396 B1 | * | 2/2003 | Halmos ....................... | 356/5.01 |
| 2001/0004399 A1 | * | 6/2001 | Nonaka et al. ............. | 382/106 |
| 2001/0043719 A1 | * | 11/2001 | Harakawa et al. .......... | 382/106 |
| 2002/0008055 A1 | * | 1/2002 | Campbell et al. ........... | 209/577 |

OTHER PUBLICATIONS

Kaplan, Karen, "Road Scholars", Los Angeles Times, Section D, Jan. 12, 1998, 2 pages.

Kanellakopoulous, I. et al., "IRIS: Intelligent Ranging with Infrared Sensors", Final Report for IDEA Project ITS–61, Transportation Research Board, National Research Council, 2000, 34 pages.

\* cited by examiner

*Primary Examiner*—Jayanti K. Patel
*Assistant Examiner*—Barry Choobin
(74) *Attorney, Agent, or Firm*—Sawyer Law Group LLP

(57) ABSTRACT

A method and system for ranging an object are disclosed. The method includes illuminating a field of view potentially including the object, synchronously receiving reflected signals from the field of view with and without illumination, capturing first and second images within an array, and generating a subtraction image using the images. One image is captured in the array while the other image is in the array. The first and second images include reflected signals from the field of view with and without illumination, respectively. The array includes first and second groups of lines that are unmasked and masked, respectively. In one exposure, the first group of lines is loaded with the first or second image. The image in the first group of lines is shifted into the second group. In another exposure, the first group of lines is loaded with the other image, which is shifted into the second group.

64 Claims, 17 Drawing Sheets

METHOD AND APPARATUS FOR INTELLIGENT RANGING VIA IMAGE SUBTRACTION

This invention was made with Government support under Contract Nos. ITS-61 and ITS-81, awarded by the National Academy of Sciences. The Government has certain rights in this invention.

BACKGROUND OF THE INVENTION

1. Field of the Invention

The present invention relates to a sensor system capable of measuring the relative position and attitude of moving and stationary objects. In particular, this sensor system can detect and track objects equipped with surfaces that act as retroreflectors in the visible and near-infrared part of the spectrum. Such surfaces are already available in the taillights of all cars, trucks, and motorcycles, as well as in roadway lane markers, and can be easily and cheaply added to objects in other environments, such as railroads, factories, and airports.

2. Description of the Prior Art

One of the emerging trends in technology development is the addition of autonomous capabilities to many new products in ground transportation (cars, buses, trucks, trains), in aviation (commercial aircraft, military drones) and in specialized applications (factory automation, airport service facilities). This trend is greatly facilitated by the miniaturization of electronic components, the rapidly decreasing cost of computing power, and the recent surge of technology transfer from military to commercial applications. These advances have not only made it technically feasible to build systems that would have been unthinkable a few years ago, but have also dramatically decreased the cost of their implementation, thus making them suitable for mass production and commercial deployment.

The motivation for this trend towards autonomous operation comes primarily from considerations of safety, comfort, and cost.

Safety is the main beneficiary in cases where unmanned drones (all-terrain vehicles, airplanes, helicopters) are used in hazardous environments. Examples of such applications include: searching for trapped people in burning buildings, collapsed structures, and spaces filled with poisonous gases; filming exclusive footage of natural disasters such as exploding volcanoes; and military operations for de-mining, reconnaissance, and surveillance behind enemy lines. The use of human-operated vehicles in these environments would endanger the health or even the lives of the operators, and would also impose minimum size restrictions that would make it impossible to explore small spaces where people may be trapped. Increased safety is also the main concern in on-board vehicle systems such as collision warning, collision avoidance, lane departure warning, and lane keeping. These systems warn the driver/operator with an audible and visible signal when the vehicle is about to collide with another object or when it is about to leave its current lane on the roadway, and, if so equipped, they automatically activate the brakes and/or the steering to reduce speed and/or change course to avoid a collision or to maintain the vehicle's current course.

In applications such as adaptive cruise control, where the speed of the vehicle is automatically adjusted to follow the preceding vehicle at a safe distance, or vehicle following, where the vehicle's speed and direction are adjusted to follow the course of the preceding vehicle, the main consideration is the comfort and convenience of the driver/operator, with increased safety being a secondary but very important benefit.

Finally, significant cost savings motivate future applications such as electronic towing, highway platooning, automated airport vehicles, and automated manufacturing robots. In electronic towing, two or more commercial vehicles are operated in tandem, with the first vehicle being manually driven by a human operator, and the following vehicles being "electronically towed" without drivers, thereby reducing the number of drivers and the associated cost by 50% or more. In highway platooning, traffic is segmented into "platoons", each composed of several cars that follow each other at very small distances of 1–2 m, driven not by their human occupants (who can resume manual operation once their car leaves the platoon), but by the on-board electronics that automate the steering, acceleration, and braking functions. This "automated highway system" has the potential of significantly increasing the traffic throughput of existing highways at a mere fraction of the cost of building new highways that would be able to handle the same additional traffic, while also improving the safety and comfort of the people who use this highway system for their transportation needs. While these applications may be several years away from their actual implementation, the same technology can be used in the near term to automate airport vehicles that carry baggage and goods between terminals and airplanes, at a much lower cost than human drivers. The same concept also applies to factory automation, where driverless vehicles can carry parts that are loaded and unloaded by automated robots.

These applications are currently in different stages of deployment. Collision warning, lane departure warning, and adaptive cruise control systems are already available as commercial products in high-end passenger cars and commercial trucks; unmanned drones are already used in military operations; and automated robots are already fully operational in many modern factories. Collision avoidance, lane keeping, vehicle following, and automated airport vehicles are still under development, but are approaching the point of commercial product release, while electronic towbars and automated highway systems are in the research stage, with several successful demonstrations already completed. The three major factors that differentiate these applications and influence the timeline of their deployment are: (1) whether their operation is autonomous or cooperative, (2) whether they operate in a controlled or uncontrolled environment, and (3) whether their role is passive or active. For example, collision warning systems are autonomous, because they rely only on measurements gathered by the host vehicle and do not require any special modifications to the surrounding cars and highway environment; they operate in the uncontrolled environment of public highways; and they passively warn the driver of an impending collision. Adaptive cruise control is also autonomous and operates in an uncontrolled environment, but it is an active system, since it actuates the throttle and brake to increase or decrease speed in order to maintain a safe distance from the preceding vehicle. Electronic towbar and automated highway systems are active (they actuate the steering in addition to the throttle and brake) and operate in an uncontrolled environment, but they are not autonomous since they rely on cooperation from their environment, namely from the preceding vehicle in the case of the electronic towbar, or from the other platoon members and the roadway infrastructure in the case of automated highways. Finally, airport and factory automation vehicles are active and cooperative systems, but they operate in a controlled environment where unexpected events can be kept to a minimum.

Despite their differences, all these applications share a common trait: they all need sensors that can provide accurate and reliable information about the surrounding environment. From collision warning to automated airport vehicles, and from adaptive cruise control to multi-car platooning, each of these systems depends critically on its "eyes", namely the ranging sensors that "see" other cars on the highway or other robots and obstacles on the factory floor, and provide crucial information about how far each of these objects is, which direction it is coming from, and how fast it is approaching.

The currently available sensor technologies can be classified into five main categories: radar (microwave or millimeter-wave), computer vision, time-of-flight laser, sonar, and GPS. These are detailed below in order of increasing utility for the applications discussed above.

Sonar sensors emit acoustic pulses and measure the time it takes for the pulse to bounce off the target and return to the sensor, usually called the "time of flight". Multiplying this time by the speed of sound yields the distance from the source to the target and back. This process provides very accurate and reliable measurements for targets that are less than 1 m away, but its performance drops off very quickly as the distance increases, and becomes unacceptable for obstacles more than 5 m away. Consequently, sonar is widely used in products whose operating range is up to approximately 3 m, such as systems that help the driver park in tight spaces by providing a visual or audible indication of the distance to the obstacles behind or in front of the host vehicle. In all of the applications discussed above, where the desired operating range is at least 20 m and up to 200 m, sonar is not a viable ranging technology.

Time-of-flight laser uses the same concept as sonar: an infrared laser emits pulses and the sensor measures the time it takes for each pulse to return. The two main differences are that (1) the energy of the laser beam is highly concentrated along a single direction, while the sonar pulses travel in all directions, and (2) the laser pulses travel at the speed of light, not at the speed of sound. The first difference implies that, in order to cover a reasonably wide field of view, the system needs either a lens that disperses the laser beam along the horizontal and vertical directions or a scanning mechanism that automatically points the laser beam at different directions. The advantage of the lens dispersion is that it is easy to implement; the disadvantage is that it makes it impossible to detect the specific direction of the target. One possible remedy for this problem is the use of several laser beams, each with its own small dispersion angle; the number of beams used is proportional to the desired resolution in terms of direction sensing, but also to the complexity and cost of implementation. The scanning mechanism, on the other hand, makes it very easy to detect the direction of the target (it is the same as the direction in which the beam was pointing when the pulse was emitted), but its construction and implementation is very complicated and very fragile, since it involves many moving or spinning parts that must be very accurately positioned with respect to each other. The second difference, namely the fact that the laser pulses travel at the speed of light, means that the time it takes for them to return to the source after being reflected off the target is about one million times shorter than for sonar. Therefore, the instruments that measure this time of flight must be extremely sensitive and accurate: in order to measure the distance to a target 30 m away with an error no larger than 1 m (a not very stringent requirement in the applications we are discussing), the sensor must be able to measure a time interval of 100 ns (30 m/$3 \times 10^8$ m/s=$10^{-7}$ s) with an error no larger than 3.3 ns. While it is entirely possible to measure signals with such accuracy, the corresponding hardware is very expensive. Currently available prototypes intended for mass production use less expensive hardware with lower resolution; as a result, their reported errors are in the order of several meters, which is not suitable for most of the applications we are discussing. Another problem with this technology is that it does not operate reliably in rain, fog, snow, or whenever the road is wet and the preceding vehicle creates "road spray". This problem is due to the fact that the laser energy reflected from airborne water particles or snowflakes confuses the sensor and results in "ghost images". This makes time-of-flight laser unsuitable for open-road applications.

Millimeter-wave radar systems transmit a modulated waveform and measure the phase shift of the reflected signal to compute the distance of the target. Since they do not measure the time of flight, they are generally more accurate than time-of-flight laser. Furthermore, their operating frequency is in the order of 10–100 GHz, which means that their wavelength is in the order of 3–30 mm, which is several thousand times larger than the 800 nm wavelength of infrared lasers. The longer wavelength renders water particles, snowflakes, and the irregularities of most surfaces essentially invisible to radar. This has two direct results: First, radar can penetrate rain, fog, snow, and road spray, which makes it ideally suited for use in poor weather conditions. Second, radar waves are efficiently reflected by almost all surfaces and materials found in everyday objects, and therefore radar sensors can detect the presence of almost any obstacle around them. While this property is useful for avoiding potential collisions, it is also the source of the main problem with radar sensors, namely multiple returns. Almost every surface reflects the radar energy, so the returned wave contains the reflections from many different objects that are at different distances and different directions; since these returns are all added into one signal, it becomes very difficult to distinguish the objects that are real targets, such as cars ahead, from others that are not, such as the pavement of the road. This problem is dealt with at both the hardware and the software level with varying degrees of success. At the software level, the solutions include sophisticated algorithms that process the radar returns and attempt to isolate the signals that are produced by targets of interest; these algorithms can be tuned to correctly detect some types of targets, such as vehicles with metal sheet covering, but usually at the expense of not detecting others, such as low-profile fiberglass-bodied sports cars. At the hardware level, the solutions are similar to those employed in time-of-flight laser, including the use of multiple radar beams and scanning mechanisms. Scanning is usually implemented through the use of a multi-beam antenna array whose component antennas have electronically controlled relative phase; appropriate selection of the component phases yields a highly directional overall antenna whose direction of maximum sensitivity scans the desired field of view.

Yet another significant disadvantage of radar is the sensitivity of its own measurements to other similar devices operating around it. The signal sent from the transmitter is reflected in all directions; hence, this reflected signal affects all other receivers operating nearby. As a result, when there are many similar devices operating in the surrounding environment, as would be the case in dense highway traffic, each object in the scene will produce many returns at different time instants, and all of these returns will show up in the signal measured by each receiver. This means that the scene becomes heavily cluttered with multiple returns, and that makes it very difficult to identify the separate targets and reliably compute their respective locations. The problem becomes even worse in the case of vehicles with similar devices traveling in opposing directions of traffic. In that case, the transmitted signal of the oncoming vehicle is much stronger than the reflections of the host signal from surrounding objects. Thus, oncoming vehicles can flood the host vehicle's receiver and render it momentarily blind.

Computer vision differs from all the above technologies in the sense that it does not transmit anything. In contrast to sonar, laser, and radar, vision is a completely passive sensing approach that simply records images, relying on existing visible light (natural or artificial) to provide the necessary illumination. These images are then processed to extract the information that is needed for the particular application, such as the existence and location of obstacles, or the curvature of the road ahead. The main advantages of computer vision are its high resolution and its ability to track many different targets at the same time. The fact that computer vision can at best detect the same obstacles as human vision means that these sensors do not operate reliably in bad weather and especially at night, if the artificial lighting is inadequate. But the main disadvantage of computer vision is the fact that, in order to realize its potential and provide reliable and accurate data, it has to process images at a rate fast enough for the corresponding application. The computational power required for such real-time image processing depends on the desired accuracy, since higher accuracy is achieved through higher image resolutions, and on the desired speed of response. For applications where the ambient scene is static or changes very slowly, such as a slow factory automation task, these requirements may be satisfied by an inexpensive microprocessor. But for the highly dynamic environment of a busy highway, where it may be necessary to process 20 frames per second and extract the necessary information from each frame in less than 50 ms, the corresponding computing power may be prohibitively expensive. In existing implementations, this obstacle is overcome through the use of specialized image processing techniques that exploit the prior knowledge of the structure of the specific application environment (highway, factory floor, airport) to significantly reduce the computational requirements.

Finally, GPS-based ranging relies on the signals from the satellites of the Global Positioning System. Each host vehicle is equipped with a GPS receiver that processes the available signals to produce a measurement of the vehicle's current position. An on-board transmitter then broadcasts this measurement to the neighboring vehicles, while a separate receiver receives the transmitted locations of the neighbors (who are assumed to be equipped with the same hardware). Thus, each vehicle knows its own location and the location of its neighbors. The advantages of this technology are (1) that the GPS signals are available everywhere on the planet, and (2) that the necessary on-board hardware is inexpensive. The main disadvantage is that this technology is completely dependent on transmissions from the neighboring vehicles. Since any object that is not equipped with this system cannot be detected by any of its neighbors, this approach can only be used in cooperative scenarios, such as electronic towing or automated airport vehicles, and is entirely unsuitable for any of the near-term autonomous applications, such as collision warning or adaptive cruise control. Another disadvantage is that the position computation based on the commercially available GPS signals is not accurate, with errors in the order of 10–100 m. This problem can be overcome through the use of a Differential GPS (D-GPS) system. In this system, secondary local transmitters at fixed known locations retransmit the GPS satellite signal along with their own position. This allows the D-GPS receiver on a moving vehicle to compute its relative position with respect to the fixed local transmitter, and thus its absolute position, with errors that are claimed to be as small as 2–5 cm. However, this solution amplifies the dependency problem described above, since it requires that not only the other vehicles but also the surrounding environment (roadway, airport) be equipped with GPS receivers and transmitters.

In summary, existing ranging technologies have significant drawbacks, which limit their utility in applications that involve dynamically changing environments. Many of these limitations can be overcome through known techniques, which, however, usually involve a substantial increase in the associated cost of the sensor. Since cost is one of the most important criteria in commercial applications, especially those involving mass markets such as the automotive industry, it would be desirable to develop a sensor technology that can provide accurate and reliable measurements at a reasonable cost.

BRIEF SUMMARY OF THE INVENTION

The present invention discloses a new ranging method that eliminates many of the drawbacks of existing technologies, and does so through the use of low-cost components that are currently mass-produced and commercially available.

The corresponding apparatus has three primary components: (1) a fast on/off illuminator, i.e., a device that generates light and that can be switched on or off in less than 1 ms, such as an array of power Light-Emitting Diodes (LEDs) or a low-power laser, or even the gas-discharge or solid-state headlights used in many modern automobiles, (2) one or more imagers with on-board storage capability, i.e., devices that can record an image and store it on the device itself protecting it from further exposure to light, such as Charge-Coupled Device (CCD) or Complementary Metal-Oxide-Semiconductor (CMOS) imaging chips, and (3) a microprocessor that operates the illuminator and the imagers automatically, and processes the data collected from the imagers to produce ranging information about objects in the imagers' field of view.

The apparatus can detect objects with retroreflective surfaces, such as those contained in the taillights of all cars, buses, trucks, and motorcycles. The detection of these objects is achieved through the process of image subtraction. The microprocessor first instructs the imager to record an image of the scene in front of it, while the illuminator is turned off; then, the microprocessor turns the illuminator on and instructs the imager to record a second image of the scene. The first image is then subtracted from the second, leaving only the returns of the retroreflective surfaces in the subtracted image. This sparse image is then stored in the microprocessor and processed with appropriate software algorithms whose function is to filter out the noise, identify the targets, and compute the distance and azimuth angle of each detected target through triangulation. The distance can be computed in terms of an absolute measure in meters, or in changes in relative distance, such as a percentage change in a given unit of time or a multiple of some measure of distance in the field of view, such as the distance between the taillights or between the detectors.

In order to guarantee that the subtraction process eliminates all returns except for the reflections of the illuminator's light from retroreflective surfaces, the two images have to be recorded in rapid succession. The present invention discloses a procedure for drastically reducing the elapsed time between the recordings of the two images. In the simplest embodiment, the bottom ⅔ of the surface of the imaging chip is covered by an opaque mask, which protects the pixels behind it from further exposure. The remaining top ⅓ is exposed and that is where both images are recorded using a four-step "expose-shift-expose-shift" process: first, the image with the illuminator off is recorded in the exposed part of the chip; second, the contents of the imager are shifted down by ⅓ the total number of rows, which means that the first image now occupies the top half of the area behind the opaque mask and is protected from further exposure; third, the image with the illuminator on is recorded in the exposed part of the chip; fourth, the contents of the imager are again shifted down by ⅓ the total number of rows, which means that the first image now occupies the bottom half and the second image the top half of the covered area, and that both of the pictures are protected from further exposure. Since the process of shifting the contents of the imager down by one row is about 100 times faster than the process of digitizing and reading out one row of data, the on-chip storage scheme renders the invention suitable for use in rapidly changing environments, such as highway traffic.

In particular, the invention is embodied in an apparatus for ranging an object comprising an illuminator to illuminate a field of view potentially including the object and an imager to receive reflected signals from the field of view. The illuminator comprises an LED, a headlight, or a laser. The imager captures a first image having reflected signals from the field of view when the field of view is illuminated by the illuminator and a second image having reflected signals from the field of view when the field of view is not illuminated by the illuminator. A circuit is coupled to the imager to synchronously control the illuminator and the imager, and to generate a subtraction image of the field of view as a pixel difference between the first image and the second image. The imager captures one of the first image and the second image while the other one of the second image and the first image is still captured in the imager.

In one embodiment the illuminator comprises a first and a second illuminator. The first illuminator is arranged and configured to illuminate a near field of view and the second illuminator is arranged and configured to illuminate a far field of view.

The imager comprises an imaging pixel array in which the pixels of the array are organized into a two dimensional array comprised of pixel lines forming a first and a second group of pixel lines. The first group of pixel lines is unmasked and the second group of pixel lines is masked to prevent direct recording of imaged data therein. In a first exposure of the pixel array, the circuit records a first set of image data in the first group of pixel lines when the field of view is illuminated by the illuminator, and then shifts the first set of image data into the second group of pixels. In a second exposure of the pixel array the circuit records a second set of image data in the first group of pixel lines when the field of view is not illuminated by the illuminator, and then shifts the second set of image data into the second group of pixel lines. The second set of pixel lines then contain the stored values of the first and second sets of image data. Since a subtraction image is the goal of the foregoing process, it does not matter whether the first (illuminated) or the second (non-illuminated) images are recorded before the other. Hence, the first exposure can be taken when the field of view is not illuminated by the illuminator, and the second exposure can be taken when the field of view is illuminated by the illuminator.

In one embodiment, the second group of pixel lines comprises a contiguous subarray of pixel lines including two thirds of the pixel array. In a first version of this embodiment the pixel array comprises rows and columns of pixels and the contiguous subarray of pixel lines forming the second group of pixel lines forms a block of columns of the pixels. In a second version of this embodiment the contiguous subarray of pixel lines forming the second group of pixel lines forms a block of rows of the pixels.

In still another embodiment the first group of pixel lines comprises alternating pixel lines in a first half of the pixel array and the second group of pixel lines comprises all remaining pixel lines in the pixel array. In a first version of this embodiment, the pixel array comprises rows and columns of pixels and alternating pixel lines forming the first group of pixel lines forms a set of columns of the pixels. In a second version of this embodiment the alternating pixel lines forming the first group of pixel lines forms a set of rows of the pixels.

In yet another embodiment the first group of pixel lines comprises alternating pixels in each line in a first half of the pixel array with each alternating pixel being offset from ones of the alternating pixels in adjacent lines of pixels to form a checkerboard pattern. The second group of pixel lines comprises all remaining pixel lines in the pixel array. In a first version of this embodiment, the pixel array comprises rows and columns of pixels and the alternating pixel lines forming the first group of pixel lines forms a set of columns of the alternating pixels. In a second version of this embodiment, the pixel array comprises rows and columns of pixels and wherein alternating pixel lines forming the first group of pixel lines forms a set of rows of the alternating pixels.

In yet another embodiment the first group of pixel lines comprises contiguous pixel lines in a middle third of the pixel array, and the second group of pixel lines comprises all remaining pixel lines in the pixel array. In a first version of this embodiment the pixel array comprises rows and columns of pixels and the middle third of the pixel array forming the first group of pixel lines forms a contiguous block of columns of the pixels. In a second version of this embodiment the middle third of the pixel array forming the first group of pixel lines forms a contiguous block of rows of the pixels.

The first and second exposures are taken in time sequence without processing of the image data between each exposure. The first and second images are taken in time sequence separated by a time interval small enough to guarantee that no substantial changes occur between the first and second images of the field of view. The time interval is approximately 10 ms or less.

The circuit further determines distance to the object in the field of view, if any, from the imager. The circuit determines either absolute distance to the object or relative changes in distance to the object in the field of view, if any, from the imager.

In the illustrated embodiment, the illuminator has a substantially single or narrow frequency band. The imager is a camera and further comprises a bandpass filter interposed between the camera and field of view. The filter is centered on the single or narrow frequency band of illumination of the illuminator. The illuminator is modulated and the imager is locked to the modulation to receive reflected signals at the modulation.

In one embodiment, the circuit comprises a computer with a memory. The computer executes several software modules. A driver module activates the illuminator and the imager synchronously with each other to capture the first and second images. An image acquisition module transfers the first and second images from the imager to the circuit. An object detection module detects reflective images in the subtraction image. A ranging module computes the distance to the object.

In one embodiment there is a single imager that is coupled to the circuit, while in a second embodiment there are two imagers coupled to the circuit. The two imagers are separated from each other by a fixed predetermined distance.

The reflected signals indicative of the object are reflected signals from a retroreflective surface, such as taillight reflectors, on the object.

In one embodiment the circuit further comprises a sequence control circuit coupled to the imager for producing a stream of pixels from the imager corresponding to the first and second image. A subtraction circuit is coupled to the sequence control circuit for subtracting the second image from the first image on a pixel-by-pixel basis. An analog-to-digital converter is coupled to the subtraction circuit to generate a digitized subtraction image on a pixel-by-pixel basis. A processor is coupled to the analog-to-digital converter for generating ranging parameters.

Alternatively, the circuit comprises a sequence control circuit, an analog-to-digital converter, a field programmable gate array coupled to the analog-to-digital converter to generate a digitized subtraction image on a pixel-by-pixel basis, and a processor coupled to the field programmable gate array for generating ranging parameters.

Still further the circuit comprises a sequence control circuit, an analog-to-digital converter, an application-specific integrated circuit coupled to the analog-to-digital converter to generate a digitized subtraction image on a pixel-by-pixel basis, and a processor coupled to the application-specific integrated circuit for generating ranging parameters.

The invention is also described as a method for performing ranging as described in connection with the apparatus above. For example, the invention is a method for ranging comprising the steps of periodically or aperiodically illuminating a field of view with an illumination signal, which field of view potentially includes an object. Reflected signals are synchronously received from the field of view with illumination and absence of illumination of the field of view. A first image of the reflected signals is captured from the field of view within an image array when the field of view is illuminated. A second image of the reflected signals is captured from the field of view when the field of view is not illuminated within the array while the first image is still captured within the array. A subtraction image of the field of view is generated which is the pixel difference between the first and second images captured in the array.

The invention can be better visualized by turning to the following drawings, which depict illustrated embodiments of the invention. The invention is expressly not to be understood as necessarily limited by the illustrated embodiments which are depicted.

BRIEF DESCRIPTION OF THE DRAWINGS

FIG. 2A is a diagram of the basic ⅔ mask scheme, where the bottom two third of the surface of the CCD imaging chip is covered with opaque stripes in order to protect the pixels behind it from being exposed. FIG. 2B is a diagram of the CCD image after the first exposure with illuminator off. The top uncovered pixels are exposed, which is indicated in the Figure with the symbol "0". FIG. 2C is a diagram of the CCD image after the first shift command. The top ⅓ exposed pixels are quickly shifted down into the middle covered part of the CCD imaging chip so that they are protected from further exposure. FIG. 2D is a diagram of the CCD image after the second exposure with illuminator on. The top ⅓ of the pixels are exposed, which is indicated in the Figure with the symbol "1". The exposed pixels with illuminator off (indicated by "0") are protected from further exposure by the opaque mask. FIG. 2E is a diagram of the CCD image after the second shift. All the exposed pixels (indicated by both "0" and "1") are shifted down to the bottom covered part of the CCD imager to prevent further exposure and wait to be read out by the microprocessor.

FIG. 5B is a diagram of the CCD image after the first exposure with illuminator off. The interlaced uncovered pixels are exposed, which is indicated in the Figure with the symbol "0". FIG. 5C is a diagram of the CCD image after the first shift command. The exposed pixels are quickly shifted down only one row into the covered part of the CCD imaging chip so that they are protected from further exposure. FIG. 5D is a diagram of the CCD image after the second exposure with illuminator on. The uncovered pixels are exposed, which is indicated in the Figure with the symbol "1". The exposed pixels with illuminator off (indicated by "0") are protected from further exposure by the opaque stripes. FIG. 5E is a diagram of the CCD image after the second shift. All the exposed pixels (indicated by both "0" and "1") are shifted down to the bottom covered area of the CCD imager to prevent further exposure and wait to be read out by the microprocessor.

Figure 1A:
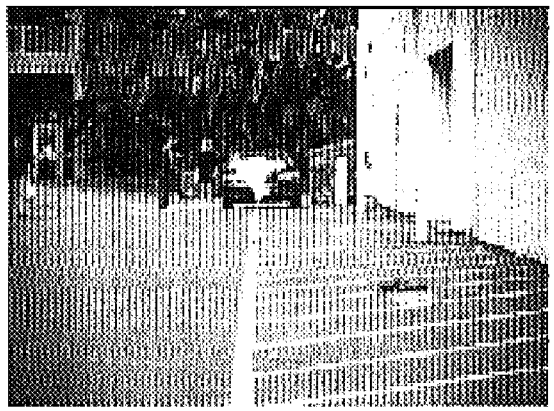
FIGS. 1A–1D are photographic data of normal photographic images of a car, a first image of the same car as read by the imager, a second image of the same car as read by the imager, and their subtracted difference.

The invention and its various embodiments can now be understood by turning to the following detailed description.

DETAILED DESCRIPTION OF THE PREFERRED EMBODIMENTS

The claimed system measures the relative position of objects with retroreflective surfaces, such as those contained in the taillights of all cars, trucks, and motorcycles. This system comprises an illuminator operating in the visible or near-infrared waveband, one or more imagers, each placed behind an e.g. fixed-focus optical lens and a bandpass filter, and a microprocessor. The microprocessor runs the software that operates the illuminator and the imagers, and processes the data collected from the imagers to produce the ranging information. Each set of ranging data is obtained by recording two images, the first one with the illuminator turned off and the second one with the illuminator turned on, and then subtracting the first image from the second one. The purpose of the subtraction process is to remove all data from the resulting image except for the returns of the retroreflective surfaces. This requires that (1) the two images are recorded in rapid succession, so that the ambient scene does not change, and (2) that both images are recorded on the same device, so that irregularities in the image intensity are automatically canceled out. This is achieved through a masking arrangement of the imagers, which allow both images to be stored on the same device before they are digitized and transferred to the microprocessor. The ranging information is then extracted from the resulting subtracted image via standard triangulation methods.

Several preferred embodiments of the invention are described, each with its own advantages that make it most suitable for a specific application. All of these embodiments implement a ranging method that detects retroreflective targets with high reliability, measures their relative position with high accuracy, and can track multiple targets at the same time. The distinguishing features of the invention are:

1. it is self-illuminated, and thus does not depend on ambient light conditions;

2. it uses the process of image subtraction to greatly simplify the final image and reduce the computational complexity of the ranging software;

3. it uses an on-chip storage scheme, which allows both images to be recorded on the same pixels, and drastically reduces the elapsed time between the recording of the two images; and 4. it uses high-resolution imagers that allow the tracking of multiple targets at the same time.

These features eliminate many of the drawbacks of existing technologies, and, equally importantly, achieve this through the use of low-cost components that are currently mass-produced and commercially available.

The corresponding apparatus has three primary components:

1. a fast on/off illuminator, i.e., a device that generates tight and that can be switched on or off in less than 1 ms, such as an array of power LEDs (Light-Emitting Diodes), a low-power laser, or a gas-discharge or solid-state headlight lamp;

2. one or more imagers with on-board storage capability, i.e., devices that can record an image and store it on the device itself protecting it from further exposure to light, such as CCD or CMOS imaging chips; and 3. a microprocessor that operates the illuminator and the imagers automatically, and processes the data collected from the imagers to produce ranging information about objects in the imagers' field of view.

The invention can detect any object with a retroreflective surface. Retroreflective surfaces contain special corner-cube reflectors that reflect almost all of the incoming light that falls on them back to the direction it came from, namely its source. Such surfaces are contained in the taillights of all cars, buses, trucks, and motorcycles, because they are required by law. Their main purpose is to make parked vehicles visible to passing traffic at night, by reflecting the light from the headlights of the passing vehicle back to the direction of the driver of that vehicle. Retroreflective surfaces are also present in the lane markers, roadside markers, and overhead signs of many highways, where their purpose is again to make the lanes, road boundaries, and signs visible at night to drivers of passing vehicles. The same property, but with less reflective efficiency, is present in the special glass paint that covers the automotive license plates of many states, many roadside signs, and many "bumper stickers".

Figure 1B:
Figure 1C:
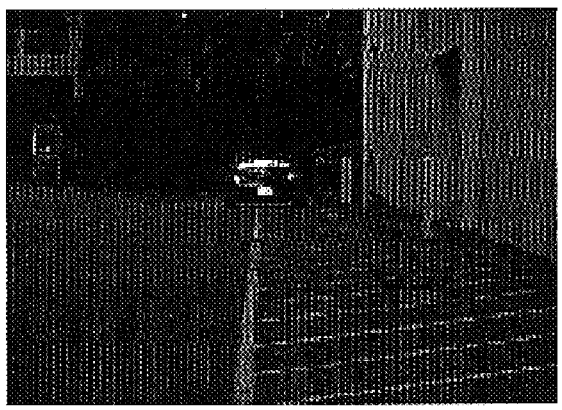
Figure 1D:
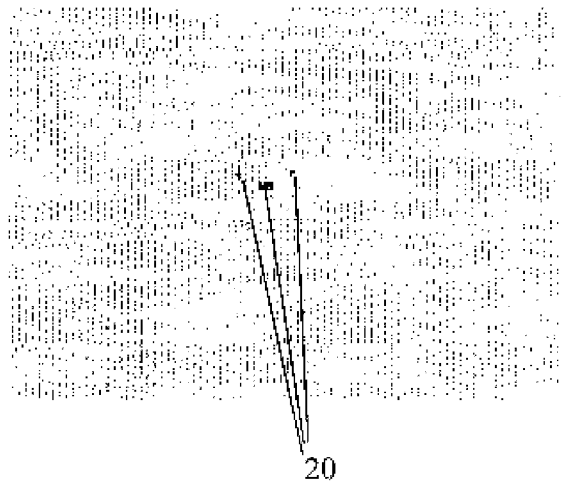

The invention utilizes the retroreflective property of these surfaces to detect the corresponding objects through the process of image subtraction as illustrated in the sequence of photographs of FIGS. 1A–1D. FIG. 1A is a conventional photograph of a car parked with its rear taillight assembly facing the camera. Numerous other objects and pedestrians surround the car. A microprocessor 9 first instructs an imager 15 to record an image of the scene in front of it as shown in FIG. 1B, which is the image recorded by imager 15; then microprocessor 9 instructs imager 15 to shift the first image to the part of its pixel array that is protected by an opaque mask; then microprocessor 9 turns illuminator 16 on and instructs imager 15 to record a second image of the scene as seen in FIG. 1C: finally, microprocessor 9 instructs imager 15 to shift the second image to the part of its pixel array that is protected by opaque mask. If illuminator 16 had not been turned on for the second image, the two images of FIGS. 1B and 1C would have contained the same information. But since illuminator 16 was on, its light produced strong reflections from any retroreflective surfaces in the field of view. These reflections are the only significant difference between the first and second image. Therefore, when the first image of FIG. 1B is subtracted from the second one of FIG. 1C, the resulting image of FIG. 1D contains nothing except for the returns 20 of the retroreflective surfaces 14.

This sparse image is then stored in microprocessor 9, and all the necessary ranging information can be extracted from its data via straightforward computations that are carried out by microprocessor 9. The specifics of these computations depend on the number of imagers 15 which are employed and on the application in which sensor 100 is being used. In particular, we distinguish two cases. In the first one, sensor 100 tracks targets with reflectors 14 at known positions. Examples of such applications include electronic towing, where each truck is supposed to follow another truck of the same company; and automated airport vehicles. In such cases, sensor 100 is only supposed to recognize vehicles that are equipped with two or more reflectors 14 in a fixed pattern and at fixed distances to each other. Then, the range and azimuth angle of the preceding vehicle can be computed via triangulation from the apparent separation of the retroreflectors 14 on the imager screen and their known actual separation on the target vehicle.

The second case occurs when sensor 100 tracks targets whose reflectors 14 can have arbitrary positions, such as cars and trucks of different sizes, as well as motorcycles. In those applications, it is necessary to use two imagers 15 that are mounted at a fixed known distance to each other on the host vehicle. Microprocessor 9 collects subtracted images from both imagers 15 and computes the range and azimuth angle of each reflector 14 from its apparent position on each of the two imagers 15 and the known separation of the two imagers 15. This second configuration with two imagers 15 results in a sensor 100 with the property of "stereoscopic vision", which can thus compute the distance of every object with at least one retroreflective surface and is therefore suitable for use in open-road applications such as collision warning and adaptive cruise control.

From the above description it is evident that when the two successive images are indeed different only in the returns of the target retroreflectors 14, then the process of image subtraction eliminates the ambient scene and makes the resulting image far less complicated and far easier to process than the corresponding images of a vision-based system. Indeed, after the image subtraction there are only a few very bright spots that can easily be located in the picture using simple detection algorithms. In contrast, in vision-based ranging sensors the target vehicle has to be identified in the ambient scene among many other objects of similar luminosity; this requires the use of very sophisticated image processing and motion tracking techniques.

In practice, however, the two successive images can record very different versions of the ambient scene. In that case, image subtraction does not eliminate the ambient scene and the task of detecting retroreflector 14 returns 20 and computing their apparent position on the image becomes much more complex. The most likely causes of these errors are the motion of the host vehicle and changes in the ambient lighting conditions, both of which result in a change of the ambient scene during the time that it takes to record and store the first image, then record and store the second image. The effect of changes in the ambient lighting is significantly reduced by placing each imager behind a bandpass filter 21 that only lets the light at the frequency of illuminator 16 pass through, but rejects light at different frequencies; such a filter 21 could be placed in front of lens 17, or it could be implemented as a special coating on the lens 17 itself. It is to be understood that filter 21 is an optional addition and may be placed at any position, such as behind the lens 17, as long as it provides the desired effect of allowing only filtered light to reach imager 15.

Figure 2A:
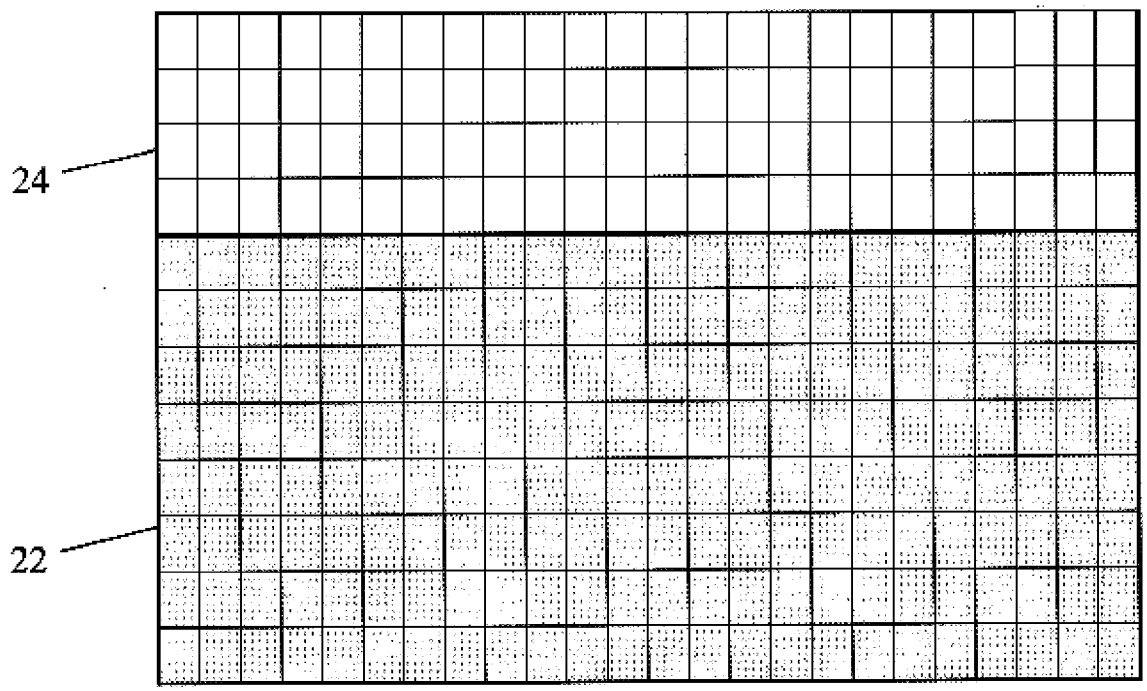
FIGS. 2A–2E are diagrammatic diagrams of the pixel content of the masked imager in a corresponding series of five cycles showing the capture, storage and shifting of two closely sequential images.
Figure 2B:
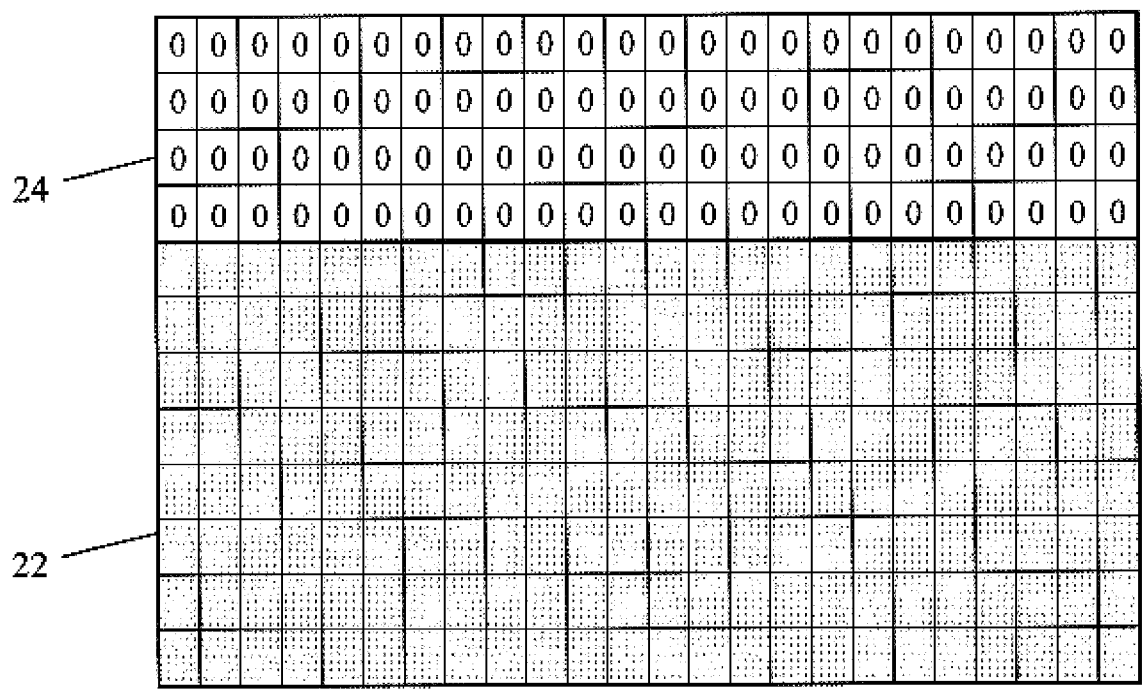
Figure 2C:
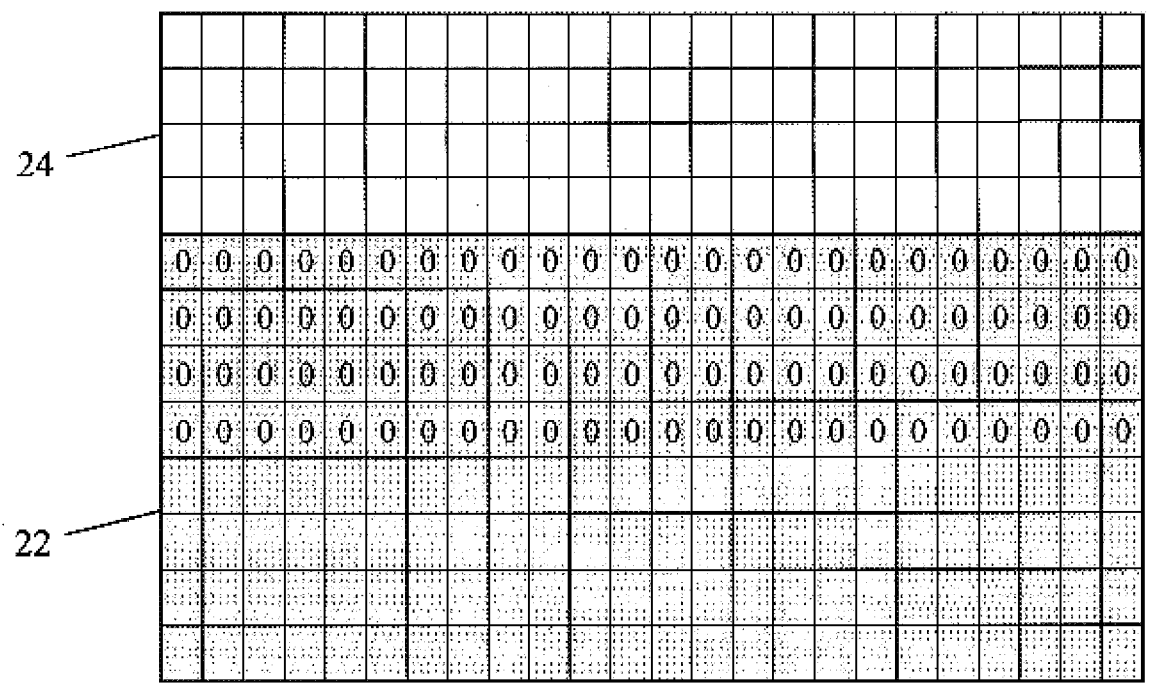
Figure 2D:
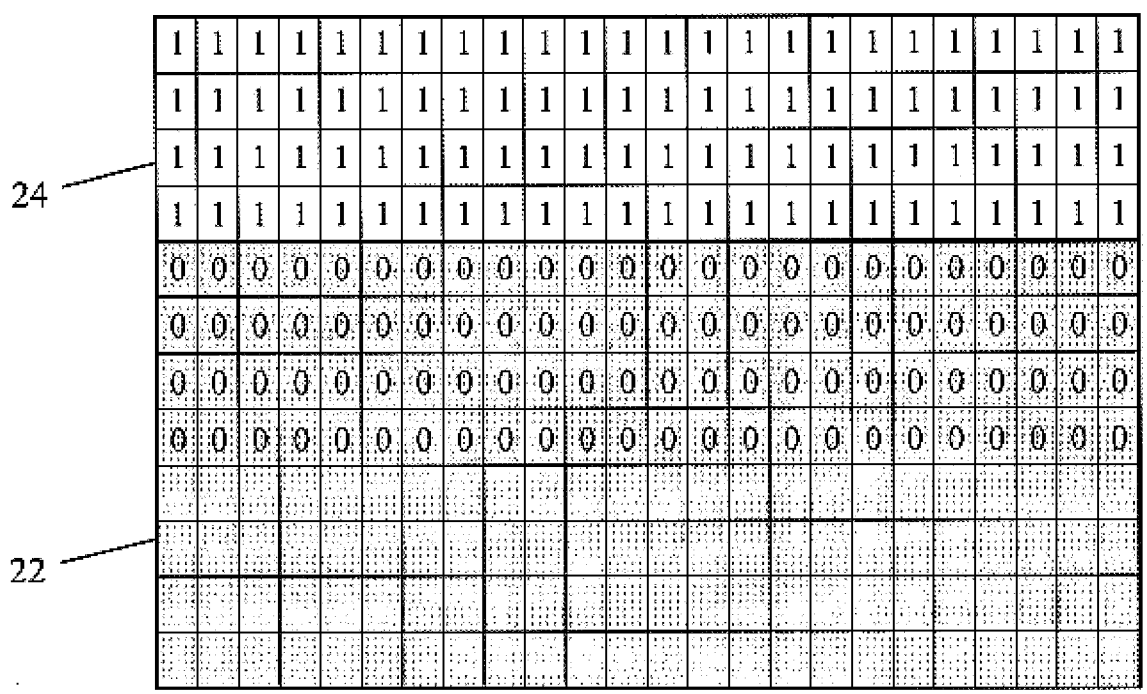
Figure 2E:
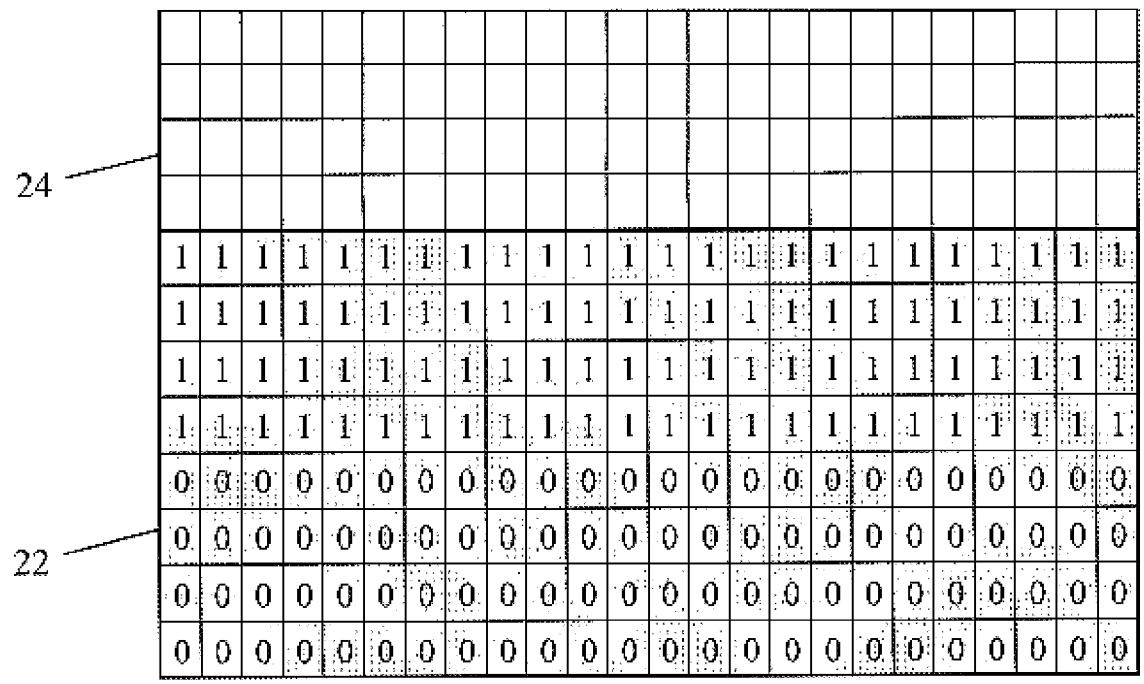

The effect of the vehicle motion, on the other hand, can only be counteracted by reducing the time it takes to record and store the two images which are then subtracted from each other. The present invention uses a very short exposure time for each image, and it stores both images on the chip of imager 15 itself, thereby eliminating the (relatively very long) delays associated with digitizing an image and transferring its data to microprocessor 9 for storage. This on-chip storage scheme is achieved through the use of an opaque mask 22 that in the preferred embodiment covers the bottom two thirds of the surface of the imaging chip and protects the pixels behind it from further exposure as shown in FIG. 2A. The remaining top ⅓ or portion 24 is exposed and that is where both images are recorded using a four-step "expose-shift-expose-shift" process, which are as follows:

1. "first expose cycle": the image with illuminator 16 off is recorded in the exposed part 24 of the chip of imager 15 as shown in FIG. 2B, where the data recorded with the illuminator off are indicated by "0";

2. "first shift cycle": the contents of imager 15 are shifted down by ⅓ of the total number of rows of pixels, which means that the first image now occupies the top half of the area behind opaque mask 22 and is protected from further exposure as shown in FIG. 2C;

3. "second expose cycle": the image with illuminator 16 on is recorded in the exposed part 24 of the chip of imager 15 as shown in FIG. 2D, where the data recorded with the illuminator on are indicated by "1"; and 4. "second shift cycle": the contents of imager 15 are again shifted down by ⅓ the total number of rows of pixel detection cells, which means that the first image now occupies the bottom half and the second image the top half of the covered area 22, and that both of the pictures are protected from further exposure as shown in FIG. 2E.

In currently available low-cost imagers, the time to shift the image by one row is determined by the maximum transfer rate of the imager, and is typically in the order of $10^{-6}$ s. The time it takes to digitize and read out one pixel of data is also limited by the maximum transfer rate of the image, as well as by the maximum speed of the analog-to-digital converter (ADC). Hence, it is at least as long as the time to shift by one row. As a result, the time it takes to digitize and read out one row of data, typically consisting of 750 pixels, is at least 750 times longer than the time it takes to shift by one row. Thus, on-chip storage is necessary in order to ensure the success of the image subtraction process. It is important to note that the on-chip storage scheme of the invention is different from the scheme used in many commercially available CCD chips. In conventional designs, the opaque mask covers the bottom half of the imaging surface, so the top half can be exposed to light and then shifted to the bottom half for protection from further exposure. In contrast, the on-chip storage scheme of the present invention requires at least ⅔ of the imaging surface to be covered by the opaque mask, to provide enough storage space for two images.

Another way to record two images in rapid succession without resorting to the disclosed on-chip storage scheme is to use two different imaging chips: one for recording the first (illuminator-off) image, and the other for recording the second (illuminator-on) image, with almost no time lapse between the end of the first exposure and the start of the second one. The two images are then digitized and transferred to the microprocessor for the subtraction process. There are two main disadvantages of this solution:

1. It is virtually impossible to find two imaging chips that have the same sensitivity to light in all of their pixels. Even two seemingly identical imaging chips of the same model from the same manufacturer will produce different images when exposed to the same scene under the same conditions for the same amount of time. This difference is caused by imperfections in the manufacturing process; it is present even in very expensive ($1000 or more) high-quality CCD chips, and becomes of course much more pronounced as the price of the imaging chip drops to $2–$10, namely levels that would be desirable for products aimed at any mass market, especially the automotive one.

2. Even if it were possible to find two identical imagers, their images would still not be the same, because it would be difficult to precisely match their optical paths. Since the two imaging chips are surrounded by circuitry, they could not be placed at precisely the same location, or even directly next to each other. In other words, there would have to be a minimum distance of a 4–6 cm between the two devices. With a simple optical setup, this distance would produce small differences in the images recorded by the two chips, which would corrupt the image subtraction process. The solution would be to use a sophisticated optical setup including a beam splitter in front of the two imagers; however, this would noticeably increase the cost of the system and reduce its robustness to vibrations.

The best and most cost-effective way to circumvent these problems and achieve good matching between the two images is to record both of them on the same pixels on the same imager 15; this way, even dead pixels (a not-so-rare occurrence in low-cost imagers) will be present at the same location in both images and thus they will not affect the subtraction process. The use of masking and on-chip storage makes it possible to record both images with the same imaging chip in rapid succession.

When the host vehicle is moving fast, even the disclosed approach might not be enough to guarantee perfect cancellation of the ambient scene. The resulting subtracted image will contain not only the returns from the reflective targets, but also other data that needs to be filtered out. Fortunately, this can be accomplished in the microprocessor using well-established software techniques such as thresholding and low-pass filtering of the data. The use of these fairly simple processing methods is made possible by the fact that retroreflectors are far more efficient at reflecting the incident light back to its source than any of the other surfaces; thus, their returns are much brighter than anything else that survives the subtraction process, and this makes it very easy to distinguish them from the noise that surrounds them.

One exception to this rule is the "blooming" effect that occurs in CCD imagers. When there is a very strong light source in the imager's field of view, such as the sun, and the exposure time is long enough, the pixels that receive the light of the strong source can "fill up" with electrons and start "spilling" their charge to neighboring pixels, usually saturating several columns of pixels in the CCD array. When this happens, the image is essentially useless and has to be discarded. The present invention reduces the effect of blooming as follows: When blooming is detected during the data processing phase, the software automatically reduces the exposure time and/or the aperture of the lens to prevent the reoccurrence of blooming in the next image sequence.

Another major advantage of the invention with respect to radar is its significantly longer operating range. This is due to the fact that, in the visible or near-infrared wavelength of illuminator 16 used in this invention, retroreflectors 14 in taillights, license plates, street signs, etc., act as mirrors. As a result, the power of the reflected light returned back to the host imagers 15 decreases with the distanced between the host and the target as $1/(2d)^2$. In contrast, at the wavelength of radar, which is thousands of times larger, all these objects act as point sources, and therefore the power of the reflected signal received back at the host detector decreases with distance as $1/d^4$. In other words, the received reflected power from a target 10 times farther away is 10,000 times weaker in the case of radar, and only 400 times weaker in the case of the disclosed invention. This significant factor of 250 explains why the present invention can detect targets at much longer distances than radar.

Yet another significant advantage of the invention with respect to other approaches that transmit energy, such as radar or sonar, is that its own measurements are unaffected by other similar devices operating around it. As we already explained, radar and sonar are adversely affected by the transmitted signals of other vehicles in the same or in the opposing direction of traffic. In contrast, the invention does not suffer from any of these problems. Due to the high directivity of retroreflectors 14, almost all the incident power is reflected back to the source. In fact, experiments with typical taillight retroreflectors 14 show that if imager 15 is moved just 5 cm away from illuminator 16, the reflected power it receives drops by about 90%; and if it is moved away by 15 cm, there is virtually no received reflection. The benefit of this very high directivity is that even when many similar devices are operating in close proximity, each of them sees only the reflection generated by its own illuminator 16. On a highway or surface street, for instance, where the minimum distance between ranging devices would be no less than 2 m, such as for two small cars driving very close to each other side-by-side, and typically would be in the order of 3–8 m, the imager in each system would be completely unaffected by any of the other transmitters operating on the road.

The only situation where another nearby device would be detected is if its transmitter is pointed directly into the imager of the host vehicle, for example when a car traveling in the opposite direction of traffic is equipped with a similar ranging device. In that case, however, the detection of that other device is highly desirable. Its transmitter would register as a point target in the resulting image, and it would thus be very simple to compute the location of this oncoming vehicle, which would otherwise have gone undetected.

A prototype of the disclosed apparatus has been built by the inventors in the Electrical Engineering Department at UCLA, and several rounds of experiments have been performed. In these experiments, the prototype has been able to consistently detect target vehicles at distances up to 200 m, and compute their distance with accuracy that ranges from about 90% at distances of 150–200 m to about 99% at distances of 0.5–15 m. The dependence of the error on the distance to the target is explained by the fact that, as the target gets closer, the returns of its taillight reflectors fill up a larger portion of the CCD image, thus occupying more pixels and allowing their apparent location to be computed with higher accuracy. The ability to compute the range to the target with higher accuracy as the target gets closer is a very desirable feature. Another significant advantage of the invented method is its very high reliability and the near-complete absence of "false-positives" (detecting a target when there is none there) and "false-negatives" (failing to detect a target that is really there).

Figure 3:
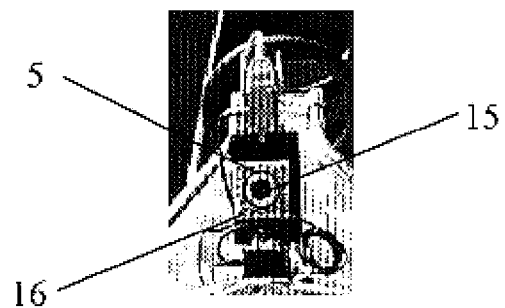
FIG. 3 is a photograph of one embodiment of the invention.

A picture of the IRIS-1 (Intelligent Ranging via Image Subtraction with 1 imager) prototype is shown in FIG. 3. Illuminator 16 comprises a ring of power LEDs operating in the near-infrared wavelength of 800 nm and positioned around the CCD imager 15. There are two sets of LEDs 5, which are interwoven on the circular arrangement shown in the picture; one set transmits a 52° wide beam to illuminate objects that are within a 30 m radius but off to the side, and the other set transmits a 7° narrow beam to illuminate objects that are as far as 250 m away but directly in front of the host vehicle. This illuminator arrangement is suitable for automotive applications, where one is typically not interested in detecting objects that are both far away and far off to the side, since those objects are not in the path of the host vehicle.

Another possible choice of illuminator 16 would be an infrared laser whose narrow beam is dispersed through a wide-angle lens to give the desired wide illumination beam. Indeed, such a laser was used in the first implementation of the prototype. Both of these illuminator choices meet the requirement of being able to be switched on or off in less than 1 ms, which is necessary in order to be able to record the two images in rapid succession; in fact, both of these illuminators 16 can be pulsed on and off at rates higher than 20 KHz, which is much faster than the minimum 1 KHz requirement. The main reason for replacing the laser with the LED array was the issue of eye safety. The laser beam is very narrow before and right after it passes through the dispersion lens. Increasing the laser's transmitted power to improve the visibility of the retroreflective targets creates a potential for eye injury if someone were to look directly into the laser at a very short distance, for example a small child that happened to walk in front of a car equipped with such a device. One solution would be to use an array of less powerful illuminators to distribute the power over a wider surface even close to the source. This is exactly what has been achieved with LEDs 5, which are eye-safe, much less expensive than lasers, consume less power, and do not require any special optics.

More generally, any visible or near-infrared light source that can be switched on and off in 1 ms or less would be a possible choice of illuminator for the IRIS system. In particular, the gas-discharge or solid-state headlights used in many modern automobiles could easily be modified to act as illuminators for the IRIS ranging system. All that would be necessary is a circuit that turns the headlamps off during the time when the "illuminator-off" image is recorded, very similar to the circuit that is used in the IRIS-1 prototype to turn the power LEDs 5 on and off. Since the necessary off-time is in the order of a few milliseconds, the resulting flicker would be imperceptible by the human eye, and it would not affect the ability of the headlights to adequately illuminate the scene ahead for night driving. In vehicles with daytime running lights, which are an increasingly popular option, this would indeed provide a very low cost illuminator 16 for the IRIS system 100.

Figure 4:
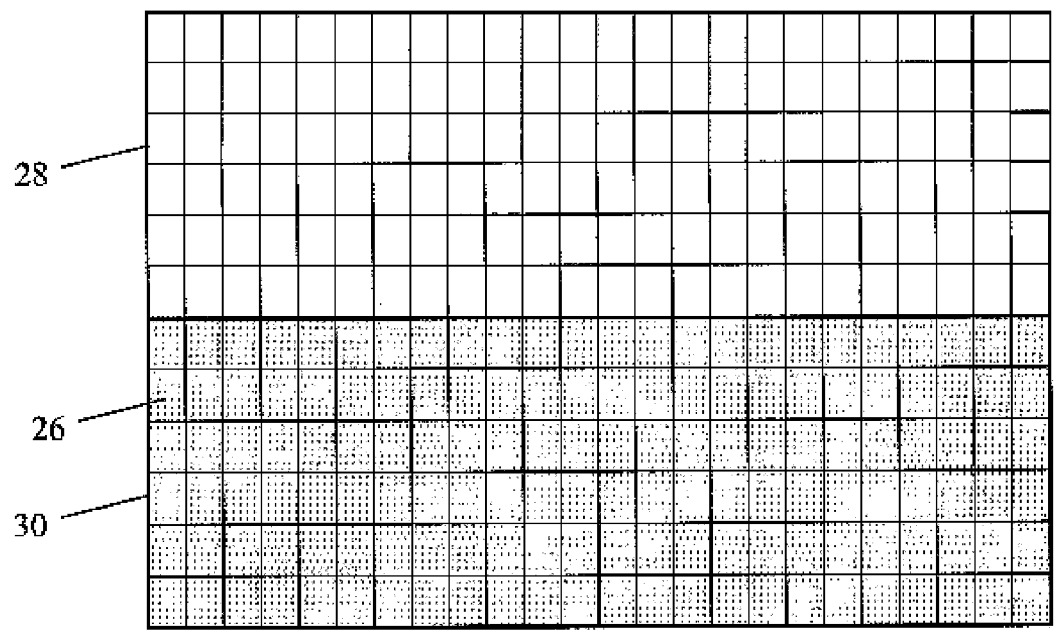
FIG. 4 is a diagram of the conventional masking arrangement for an imager.

The imager 15 used in the IRIS-1 prototype 100 is a CCD camera that uses an array of 750×480 pixels, with an opaque mask 26 that covers the bottom half of the chip, namely the bottom 240 rows, as shown in FIG. 4. This allows the user to record one image on the top half 28 of the chip and then shift it rapidly to the bottom half 30, where it is protected from further exposure to light. This image can then be read out through the single readout channel connected to the very last row of bottom half 30. The image is shifted down one row at a time, and the bottom row is shifted to the right one pixel at a time. Thus, each pixel is read out separately through the single channel, which includes a slow 12-bit ADC. As mentioned above, this readout process can be very slow. In the original camera implementation, the time it took to digitize and read out one row of pixels was approximately 5 ms, so reading out the entire image consisting of 240 rows took about 1.2 s. This means that, using the standard version of the camera without any special masking scheme, the elapsed time between the recordings of the two images would be at least 1.2 s, which is completely unacceptable for any fast-changing environment, and is suitable only for applications where neither the target nor the host vehicle is moving, and the ambient scene is not changing.

In order to make the prototype suitable for high-speed applications, the ADC was replaced with a much faster one, so that the camera could be driven at its maximum transfer rate. As a result, the readout time for one row of pixels was reduced by a factor of 50 to about 0.1 ms. Even with this acceleration, however, the elapsed time between the two images would be about 25 ms, which is still unacceptably slow for automotive applications. Therefore, the opaque mask was replaced with a larger one that covers the bottom 320 rows of the chip, namely ⅔ of the rows, as shown in FIGS. 2A–2E described above. This modified masking scheme facilitates the use of the four-step "expose-shift-expose-shift" on-chip storage scheme described above, which reduces the elapsed time between the two images by another factor of 150 to a mere 0.16 ms. This ⅔ masking scheme is simple to implement on a prototype and very inexpensive to build in mass production, since it is just a straightforward modification of the ½ masking scheme that already exists in many CCDs. However, it is by no means the only masking scheme within the scope and spirit of the claimed invention.

Figure 5A:
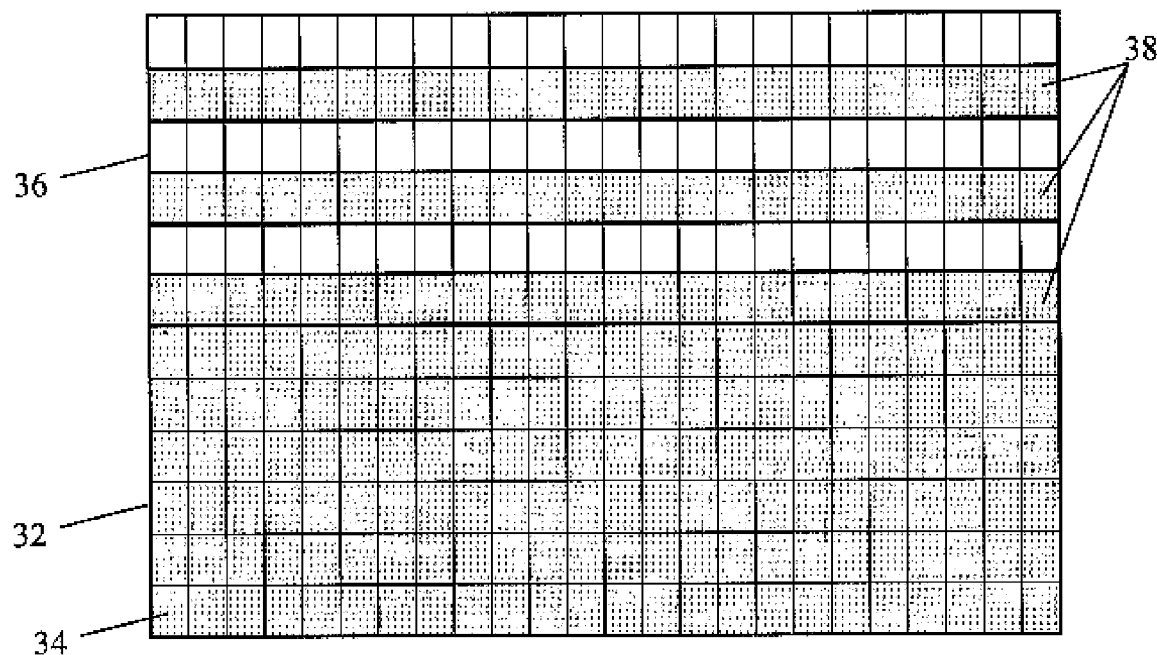
FIG. 5A is a diagram of an alternative masking arrangement for an imager of the invention in which every other row in the top half of the imager is covered by an opaque stripe.
Figures 5B, 5C:
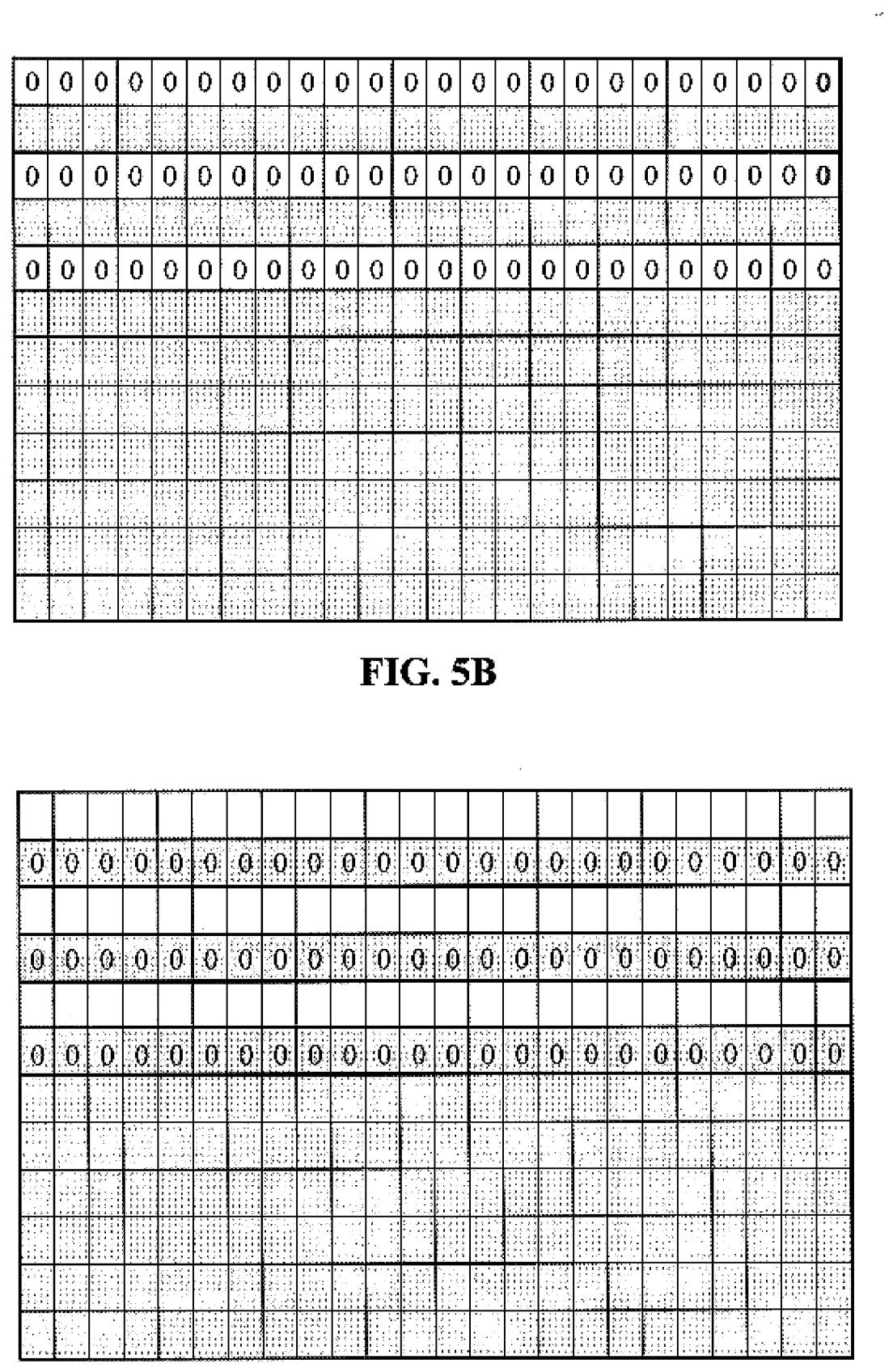
Figures 5D, 5E:
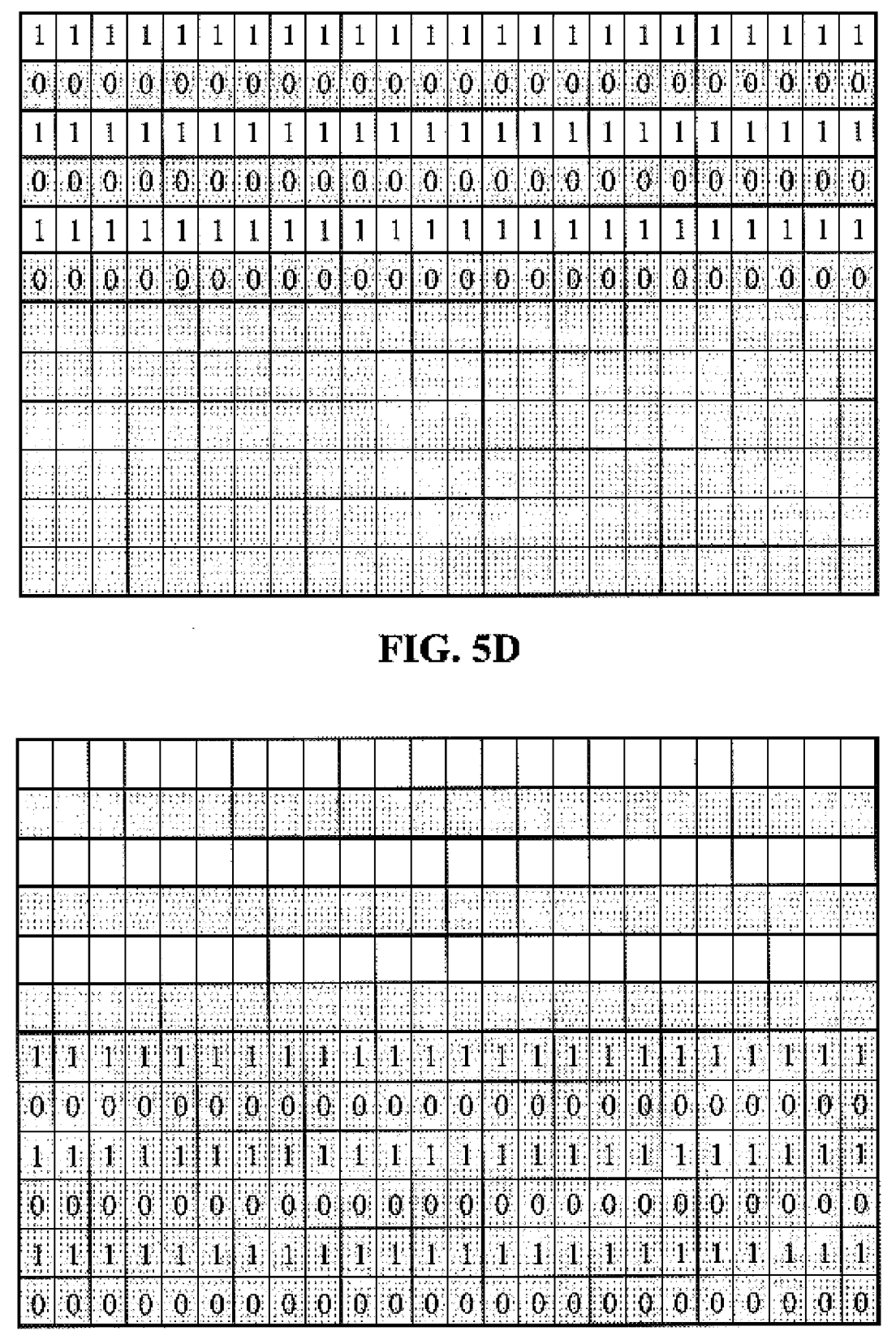

Another choice would be an interlaced scheme, where the bottom half 32 is covered by the standard mask 34, and the top half 36 has every other row (or every other 2 rows, or every other 3 rows, etc.) covered by opaque stripes 38, as shown in FIG. 5A. With this arrangement, the recording process would be modified as follows: expose imager 15 as shown in FIG. 5B, shift down by one (or 2, or 3, etc.) rows as shown in FIG. 5C, then expose again as shown in FIG. 5D, and then shift the whole image down by 240 rows as shown in FIG. 5E, so that the two interlaced images are protected behind lower mask 34. Indeed, the first implementation of the IRIS-1 prototype used this masking arrangement with every other row covered.

The main reason for replacing this interlaced scheme with the ⅔ scheme was the fact that it was very difficult to implement and to repair, and its implementation in mass production would be more costly than the ⅔ scheme, since it would require more extensive modification of existing CCD production lines. Moreover, the ⅔ scheme actually gives higher vertical resolution, since the subtracted image consists of 160 rows, while for the interlaced scheme it consists of only 120 rows.

Figure 6:
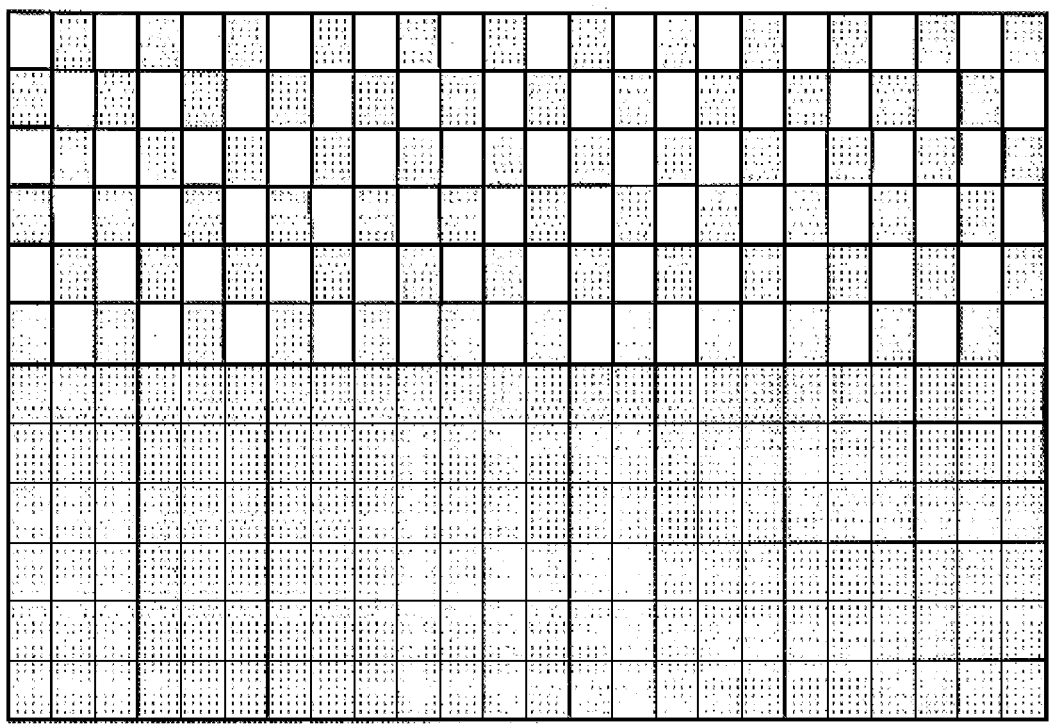
FIG. 6 is a diagram of another embodiment of the masking of the imager which is a checkerboard mask scheme.
Figure 7:
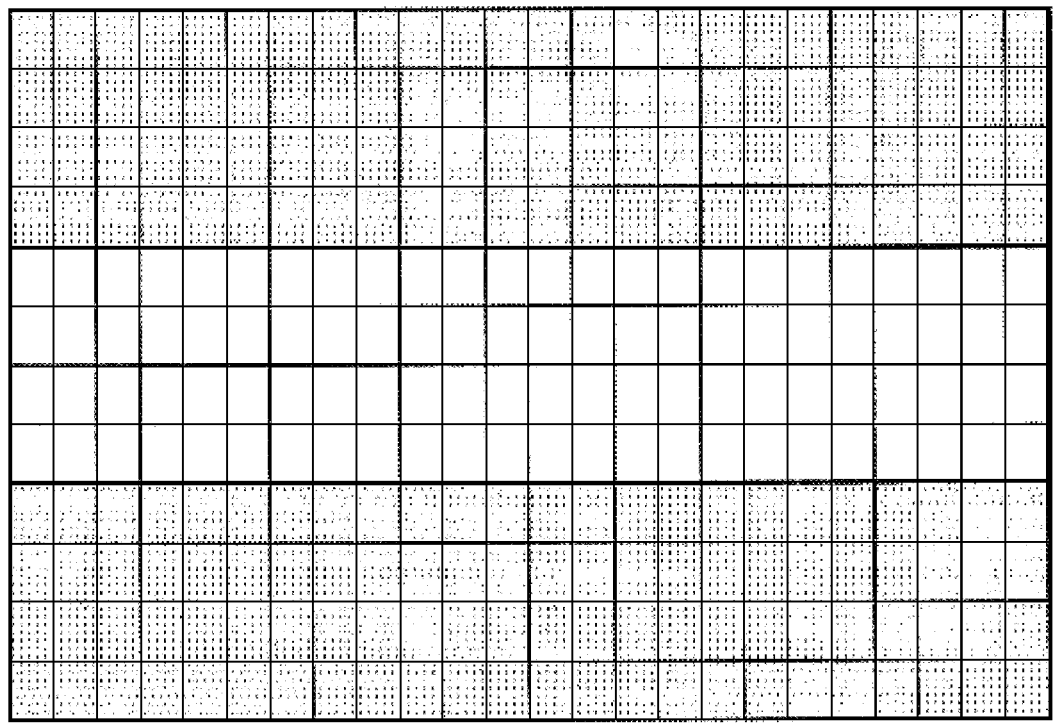
FIG. 7 is a diagram of another embodiment of the masking of the imager which is a mid-⅓ mask scheme.
Figure 8:
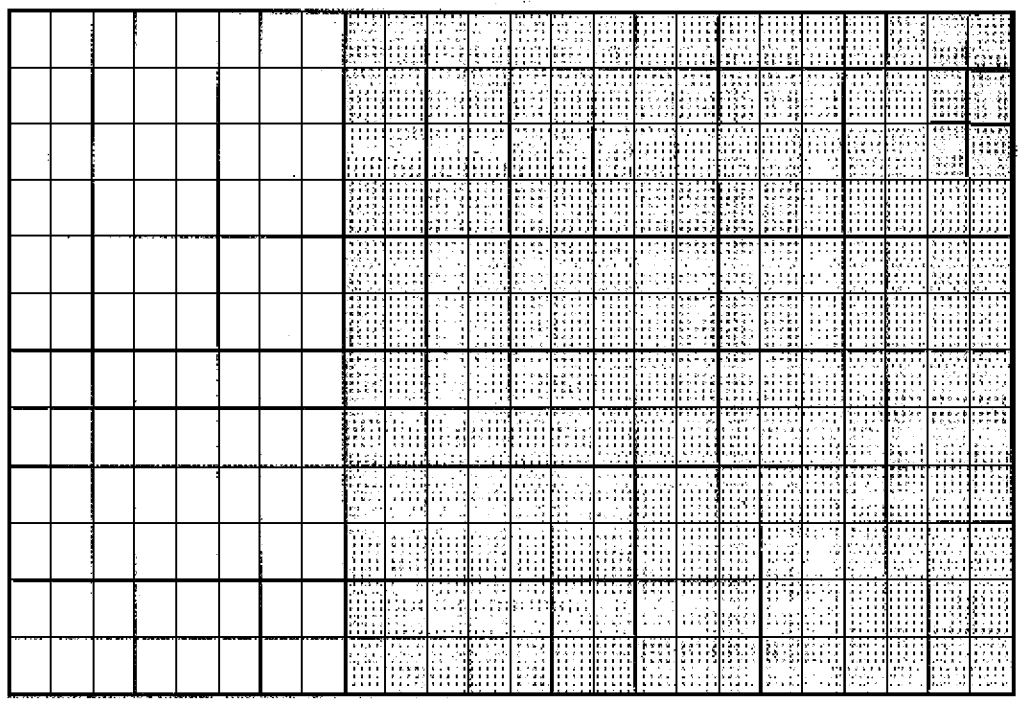
FIG. 8 is a diagram of another embodiment of the masking of the imager which is a rotated ⅔ mask scheme.
Figure 9:
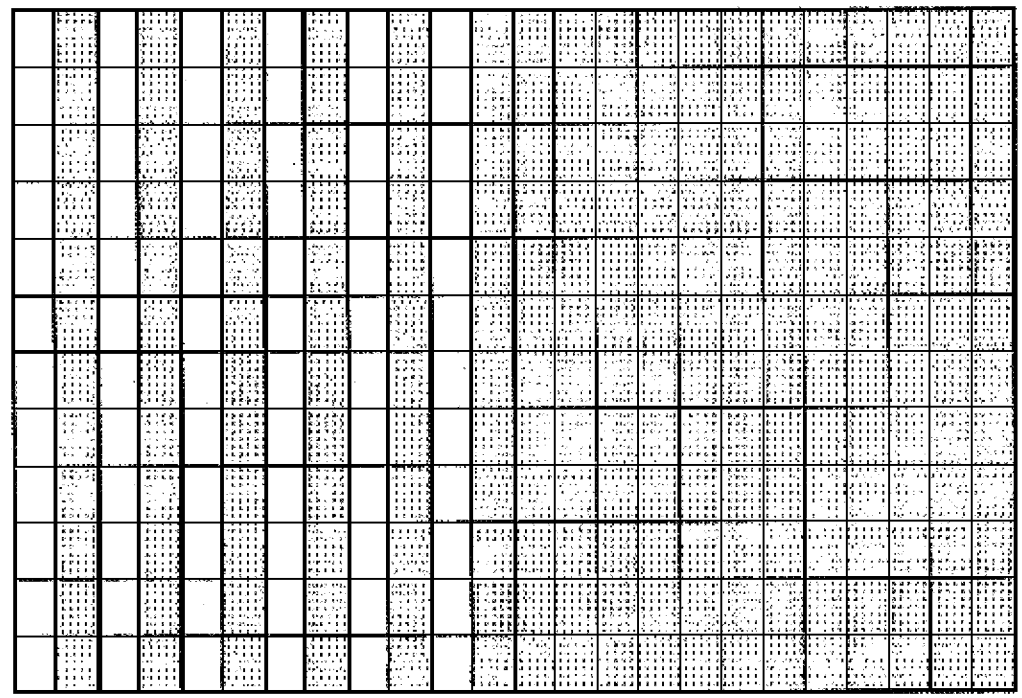
FIG. 9 is a diagram of another embodiment of the masking of the imager which is a rotated interlaced mask scheme.
Figure 10:
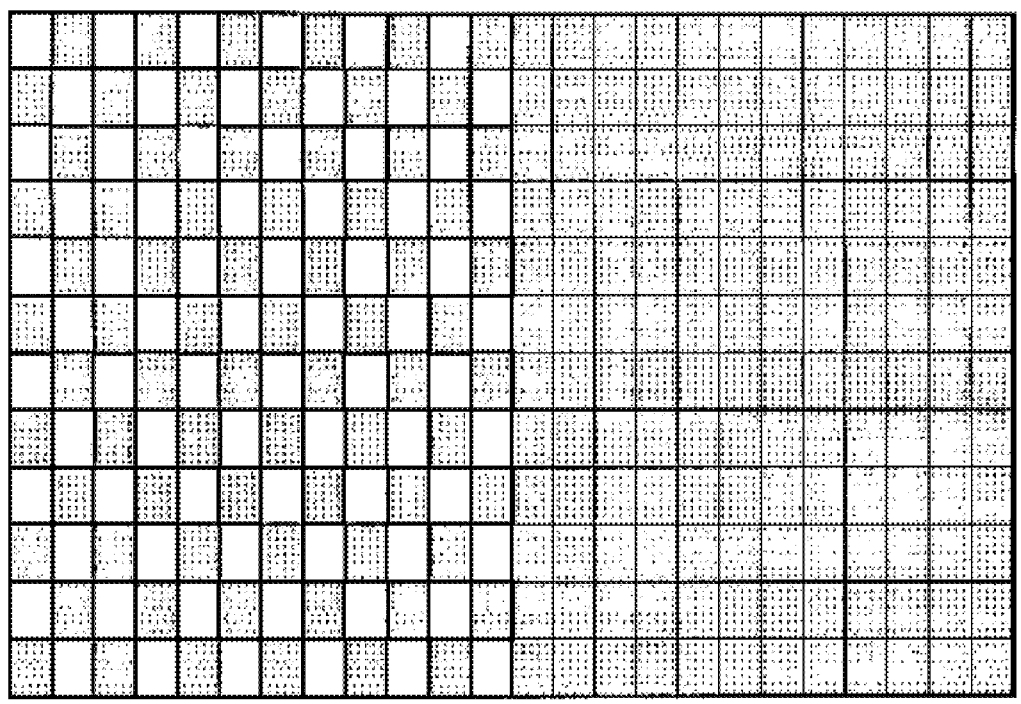
FIG. 10 is a diagram of another embodiment of the masking of the imager which is a rotated checkerboard scheme.
Figure 11:
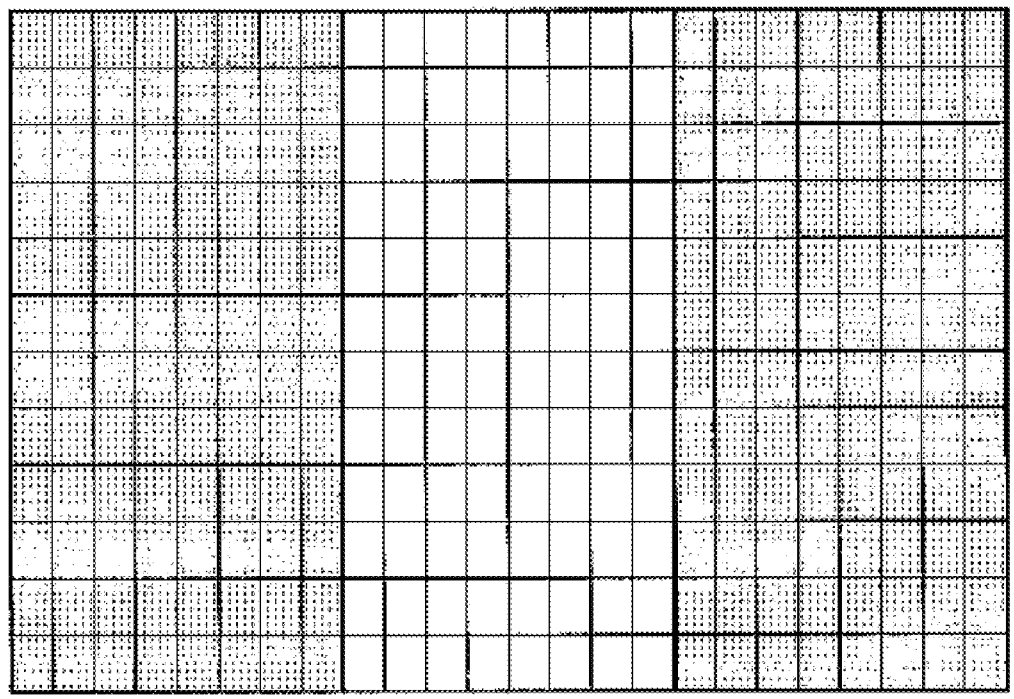
FIG. 11 is a diagram of another embodiment of the masking of the imager which is a rotated mid-⅓ mask scheme.

There are of course other possible choices for a masking scheme, such as the checkerboard pattern shown in FIG. 6, where the four-step process could be the same as for the interlaced pattern, namely "expose, shift down by 1 row, expose, shift down by 240 rows", or it could be modified to "expose, shift right by 1 column, expose, shift down by 240 rows";

the mid-⅓ scheme shown in FIG. 7, where the four-step process is "expose, shift the middle ⅓ up by 160 rows, expose, shift the middle ⅓ down by 160 rows";

the rotated ⅔ scheme shown in FIG. 8, where the four-step process is "expose, shift right by 250 columns, expose, shift right by 250 columns";

the rotated interlaced pattern shown in FIG. 9, where the four-step is "expose, shift right by 1 column, expose, shift right by 375 columns";

the rotated checkerboard pattern shown in FIG. 10, where the four-step process could be "expose, shift right by 1 column, expose, shift right by 375 columns", or "expose, shift down by 1 row, expose, shift right by 375 columns";

the rotated mid-⅓ scheme shown in FIG. 11, where the four-step process is "expose, shift the middle ⅓ right by 250 columns, expose, shift the middle ⅓ left by 250 columns"; and other combinations similar to the above.

The main advantage of the ⅔ masking scheme currently used in the IRIS-1 prototype is that it is the simplest one to implement with existing CCD chips, because the modification of the mask is easy, and because existing CCD chips have a single readout channel that reads the rightmost pixel of the bottom row. An additional advantage is that this scheme gives the maximum possible horizontal resolution (750 pixels), and good vertical resolution (160 rows). This makes it suitable for automotive applications, where typically the need for horizontal resolution is much greater than the need for vertical resolution, since most objects one is interested in tracking on the road are approximately at the same horizontal level. The other masking schemes listed above are typically much harder to implement in a prototype, and would cost more to mass-produce, although all of them are entirely feasible with existing CCD fabrication technology. The interlaced and checkerboard schemes can also use the bottom row for readout, but the other schemes need different readout channels: the first and last row (mid-⅓), the last column (rotated ⅔, rotated interlaced, rotated checkerboard), or the first and last column (rotated mid-⅓).

The interlaced and checkerboard schemes have an additional potential advantage: they facilitate a different recording scheme, called "streaming". In this mode, the four-step process becomes "expose, shift down by one row, expose, shift down by one row" and it is repeated continuously. As a result, each row is exposed to light not once, but 120 times, either with illuminator 16 always on, or with illuminator 16 always off (of course, in order to avoid overexposure and blooming, the duration of each exposure would have to be made 120 times shorter). This means that each row that reaches the masked bottom half of the imager contains information that has been averaged in the vertical direction, and thus has no vertical resolution, while maintaining its full horizontal resolution. This mode of operation could be useful in applications where the target has been locked on and the host just needs to track the specific target's distance and azimuth angle.

Figure 12:
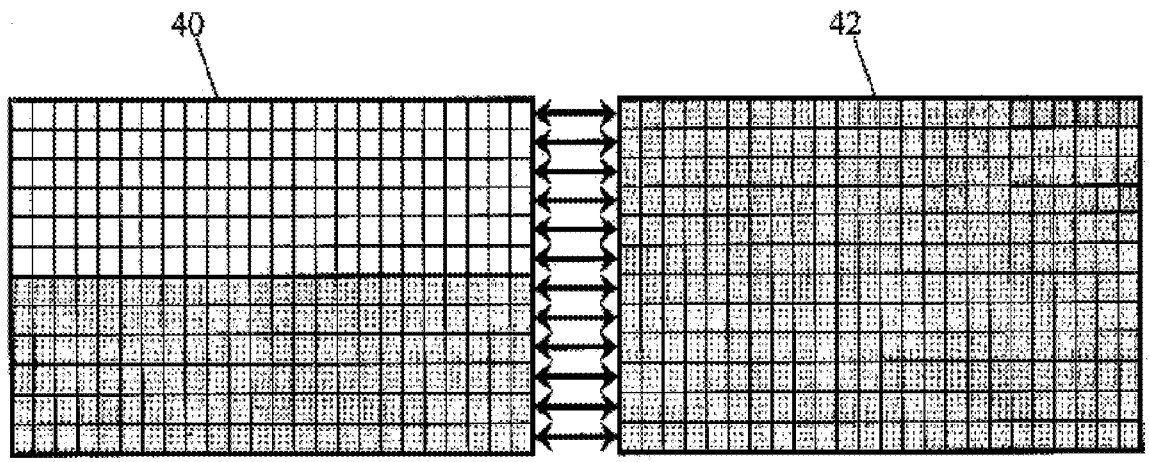
FIG. 12 is a diagram of another embodiment of the masking of the imager which is an array-to-array transfer scheme.

Yet another alternative for on-chip storage would be to connect a regular CCD chip 40 with the ½ masking scheme to a second pixel array 42 of the same dimension which is completely protected from light, as shown in FIG. 12. If the time it takes to transfer one row from one array to the next could be made as fast as the process of shifting the data down by one row, namely $10^{-6}$ s, then this arrangement would work as well as any of the on-chip masking schemes described above, and would actually provide higher resolution (750×240) for the final subtracted image. However, it would inevitably be more expensive to produce, since it requires an additional pixel array and additional circuitry for connecting the two arrays.

An interesting variation of this scheme would be to replace CCD imager 15 with a CMOS imager and connect it either to one completely masked pixel array that has twice the rows or columns, or to two protected pixel arrays of the same dimension that are connected in series to each other. The advantage of CMOS imagers is that they are very inexpensive to produce. However, in currently available implementations they lack the ability to transfer the contents of one row or column to the neighboring row or column, and that is why they cannot be utilized with any of the masking schemes described above. Of course, if future implementations acquire this important shifting capability, those versions could be used in the disclosed apparatus in place of the CCD chips. The two configurations proposed here would work with existing CMOS imagers, provided of course that the transfer to the other arrays would be fast enough.

Figure 13:
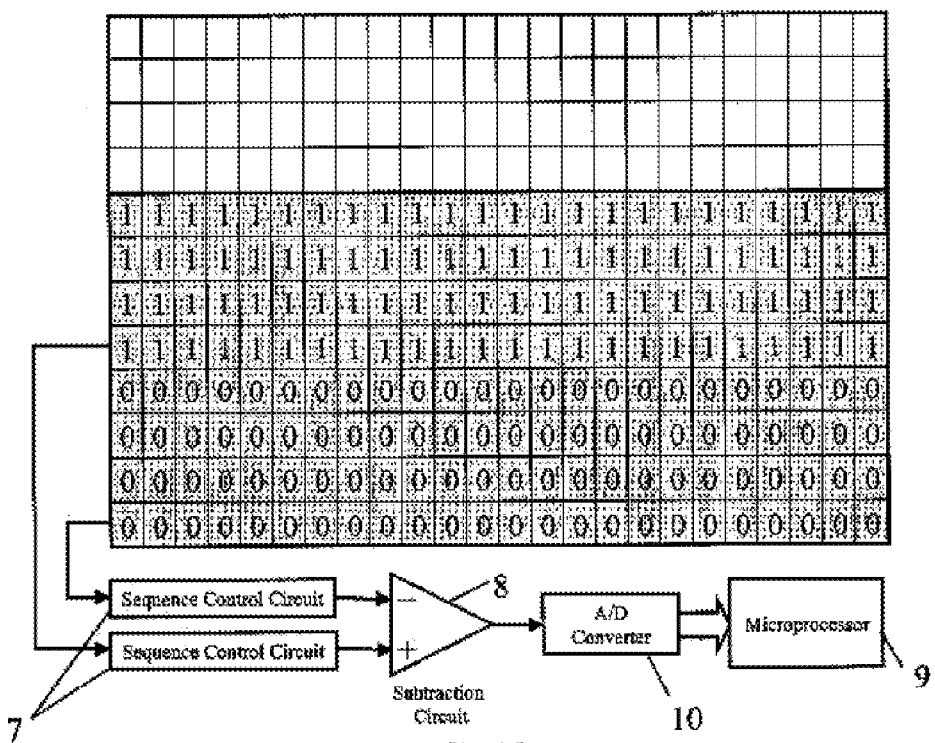
FIG. 13 is a block diagram of an imager coupled to readout circuitry which reads two rows or columns simultaneously using a sequence control circuit in which these two outputs are coupled to the two inputs of a subtraction circuit (such as a differential amplifier), whose output would then be the (analog) difference between the pixels.

Two very important issues associated with the readout capability are whether the image subtraction is an analog or digital process, and whether it is performed by hardware or by software. In the IRIS-1 prototype, both the illuminator-off and the illuminator-on images are digitized and read out into a laptop computer, where they are subtracted digitally in software. The disadvantage of this process is that it makes a 12-bit ADC necessary, in order to obtain the accuracy needed to make the image subtraction process work properly. An alternative approach would be to modify the CCD readout path so that one can read two rows or columns simultaneously using the sequence control circuit as shown in FIG. 13, and connect these two outputs to the two inputs of a subtraction circuit (such as a differential amplifier), whose output would then be the (analog) difference between the pixels as shown in FIG. 13. The main advantages of this approach would be:

an increase in data transfer speed, since now only the subtracted image, which consists of half the pixels, needs to be transferred to microprocessor 9;

a reduction in computational speed and memory, since the image subtraction process is already performed and does not need to be performed by microprocessor 9; and the ability to use faster and less costly lower resolution (10-bit, 8-bit, 6-bit) ADCs, since there is no longer a need for the high conversion accuracy required for the digital subtraction process.

The implementation of this analog subtraction scheme would depend on the masking scheme used. The rows or columns that would have to be read out and connected to the differential amplifier could be rows 1 and 161 for the ⅔ scheme of FIGS. 2A–2E, rows 1 and 2 for the interlaced scheme of FIGS. 5A–5E and the checkerboard scheme of FIG. 6, rows 1 and 321 for the mid-⅓ scheme of FIG. 7, columns 500 and 750 for the rotated ⅔ scheme of FIG. 8, columns 749 and 750 for the rotated interlaced scheme of FIG. 9 and the rotated checkerboard scheme of FIG. 10, and columns 250 and 750 for the rotated mid-⅓ scheme of FIG. 11.

Figure 14:
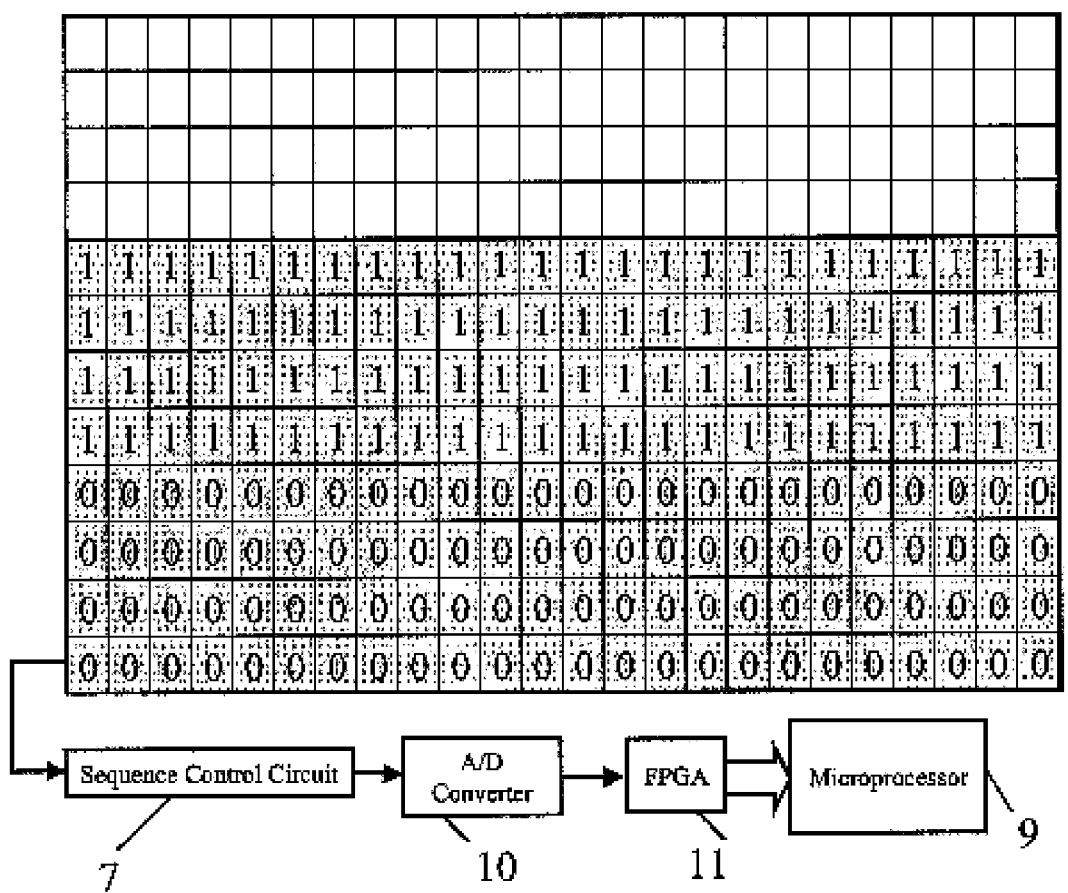
FIG. 14 is a block diagram of an imager coupled to readout circuitry similar to FIG. 13 except a dedicated Field-Programmable Gate Array (FPGA) between the output of the ADC and the input to the microprocessor is employed instead of the subtraction circuit between the sequence control circuit and A/D converter.

Another possibility for fast subtraction would be to connect a dedicated Field-Programmable Gate Array (FPGA) 11 as depicted in FIG. 14 between the output of the ADC 10 and the input to the microprocessor 9 as shown in FIG. 14. The FPGA 11 can download the digitized images from the imager significantly faster than microprocessor 9 can, and it can be designed to essentially perform a subtraction of the two digitized images in hardware. This solution would still increase the overall data transfer speed and would also reduce the computational speed and memory requirements on microprocessor 9. However, it would not alleviate the need for a more expensive 12-bit ADC, since the subtraction process would take place after the digitization of the image data. The cost would also be increased by the addition of the FPGA and the interconnections. In a mass-production version, the FPGA could of course be replaced by an Application-Specific Integrated Circuit (ASIC) that would be faster and less expensive.

Figure 15:
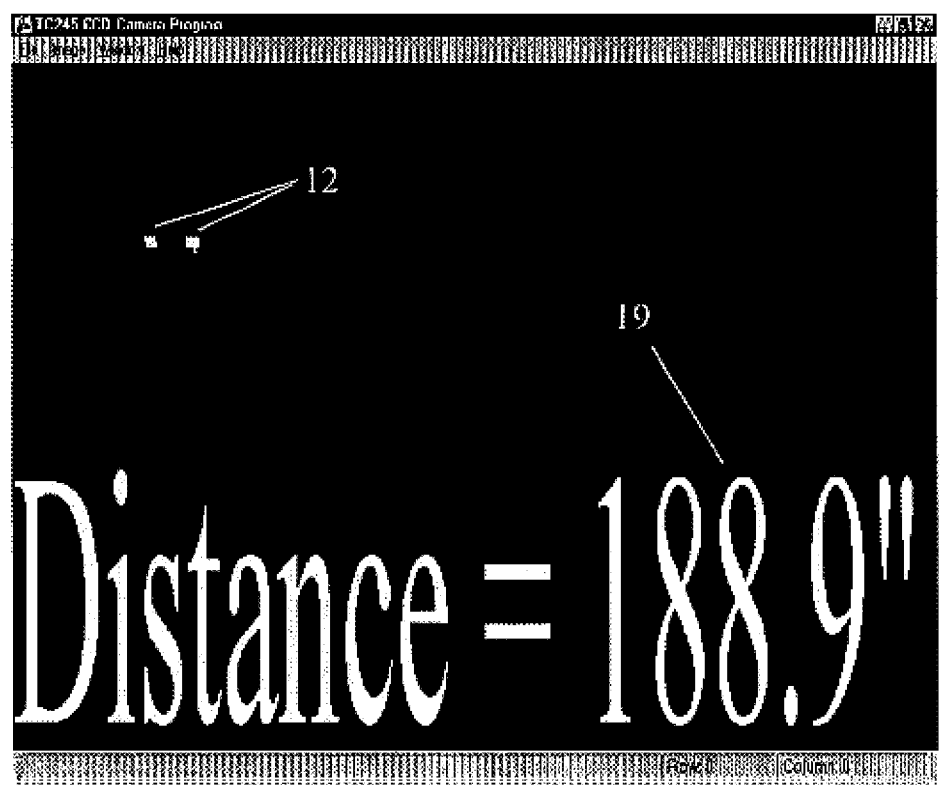
FIG. 15 is an illustration of a typical subtracted image obtained with the IRIS-1 prototype.
Figure 16:
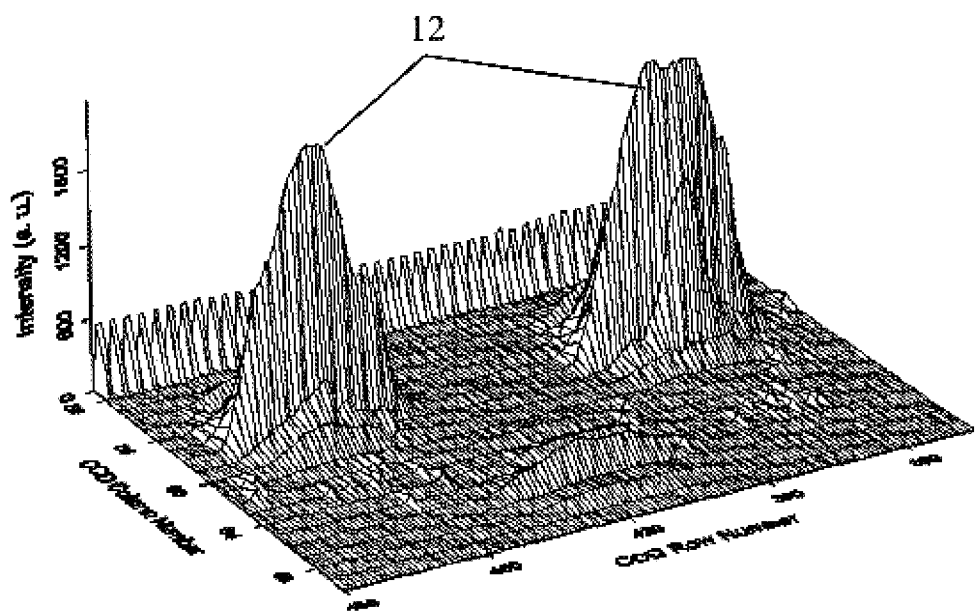
FIG. 16 is an intensity plot corresponding to the taillight images of FIG. 15.

A typical subtracted image obtained with the IRIS-1 prototype of FIG. 3, is shown in FIG. 15. It is clear that the reflections of the taillights are the only bright objects in the field of view, as confirmed by the corresponding intensity plot shown in FIG. 16. In this experiment, the exposure time for each of the original images is 10 ms (typically it varies between 1 ms and 30 ms), and the system is ranging a single vehicle. It is clear that the returns from the taillights are much higher than the noise floor, and therefore they are virtually impossible to miss when they are present (no false-negatives), or to see when they are not present (no false-positives).

Figure 17:
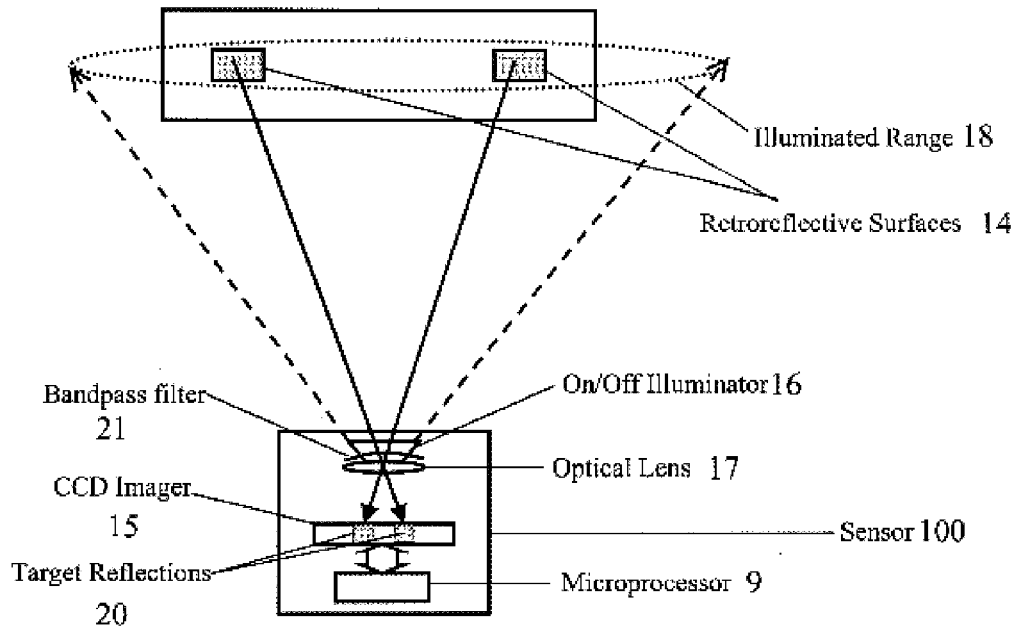
FIG. 17 is a schematic diagram of a first embodiment of the invention, IRIS-1, where only one imager is used.

In this case, the distance, azimuth angle, and elevation of the vehicle in front is computed via a standard triangulation methodology by comparing the known separation between the taillights to their apparent separation on the subtracted image as shown in the schematic drawing of FIG. 17. Since this prototype uses only one CCD imager, its ranging data is accurate only when it is tracking a target with a known retroreflector configuration, such as a vehicle whose taillight separation is known. This assumption could be satisfied in a controlled environment (electronic towbar, factory floor, airport runway), where the reflectors have to be added and could always be arranged in the same pattern.

Figure 18:
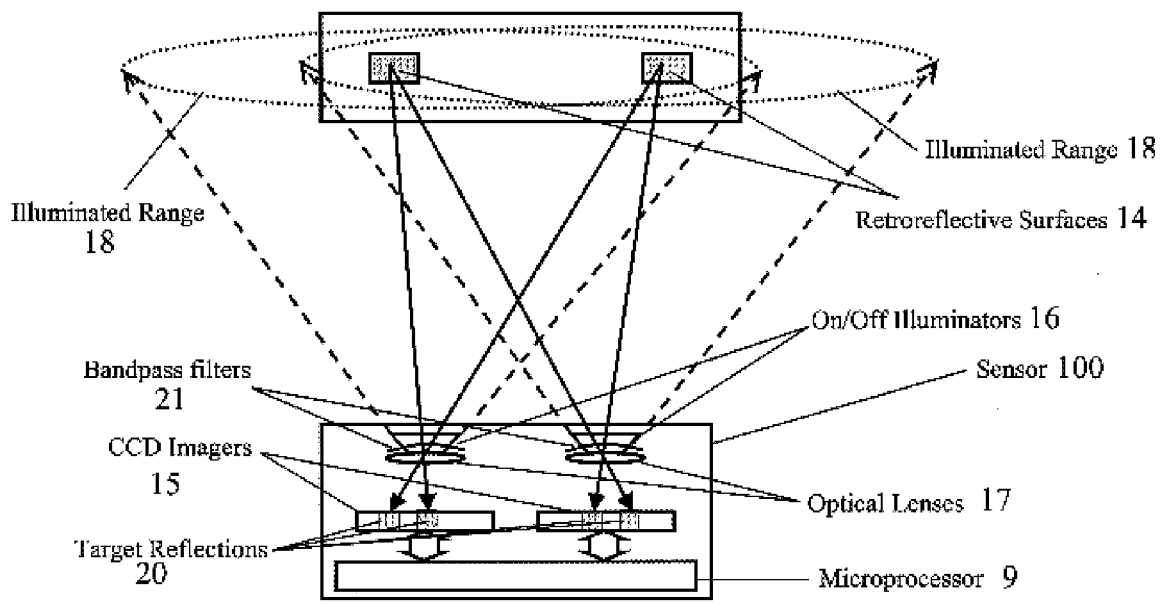
FIG. 18 is a schematic diagram of a second embodiment of the invention, IRIS-2, where two imagers are used, both with the same field of view.

However, in a general highway environment, vehicles of many different types with different taillight configurations have to be tracked accurately. Furthermore, it is necessary to detect and track motorcycles, which have only one taillight, as well as vehicles that have additional retroreflectors apart from the ones in their taillights. The solution to this problem is to use two imagers 15 on the host vehicle, whose separation is fixed and of course known. In this "stereoscopic" IRIS-2 configuration as shown in FIG. 18 triangulation is performed by comparing the different apparent positions of each reflective target on each of the two imagers to the known separation of imagers 15. The location of each target 14 can be accurately computed, regardless of whether target 14 is a taillight, a bumper-sticker, a street sign, or a lane marker. Therefore, the IRIS-2 sensor can detect and track any object with at least one retroreflective surface, including motorcycles, cars with one broken or missing taillight, even bicycles and pedestrians wearing reflective clothing.

It has been already mentioned that the present invention can use two illuminator beams, one for the near field and one for the far field. This arrangement ensures that all targets of interest will be adequately illuminated. However, the accuracy in the computation of distance, azimuth, and elevation will still deteriorate as the actual distance of the target increases, since the accuracy is proportional to the number of pixels illuminated by the target reflection.

Figure 19:
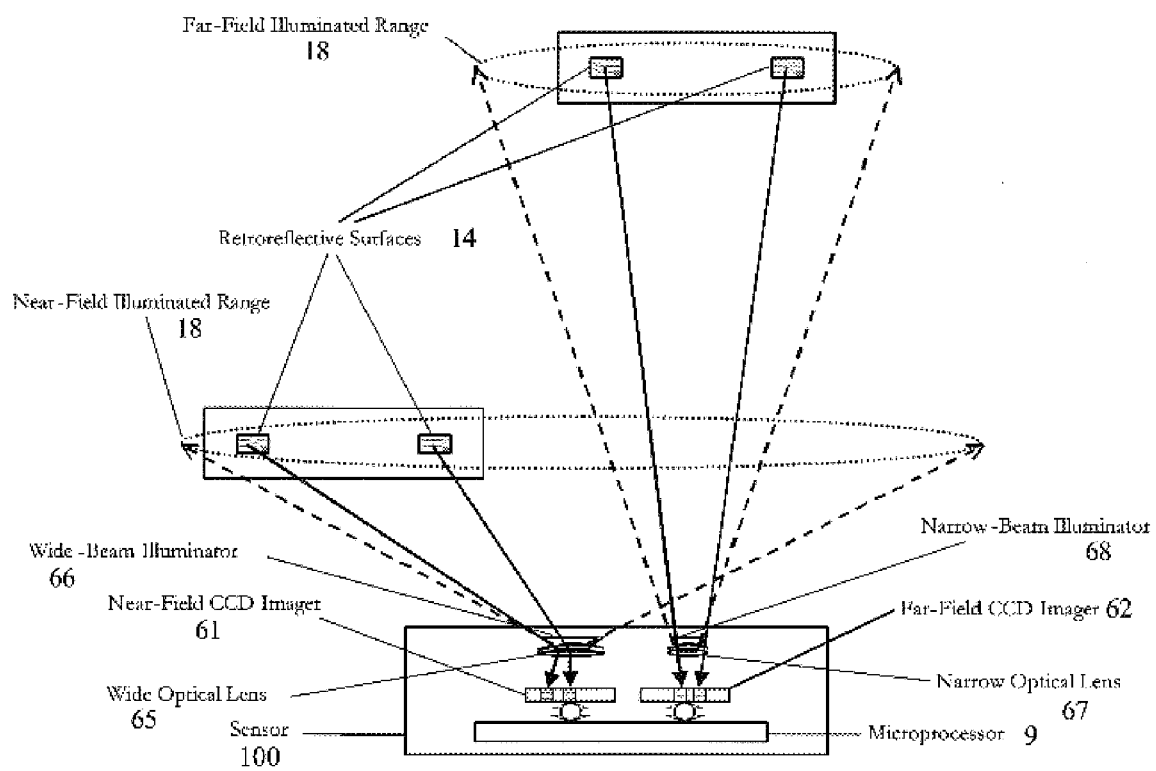
FIG. 19 is a schematic diagram of a third embodiment of the invention, IRIS-1.2, where two imagers are used, one with a near-distance field of view and the other with a far-distance field of view.

FIG. 19 illustrates a modification that can improve the ranging accuracy for targets that are far away using at least two separate imagers 61 and 62. The first imager is a near-field CCD imager 61, that operates with a lens system 65 having one or more lenses providing a wide field of view. The second imager is a far-field CCD imager 62 that includes a lens system 67 having one or more lenses providing a narrow field of view. This can be accomplished with a single illuminator having an illuminator field of view consistent with both the near field CCD imager 61 and the far-field CCD imager 62. If desired, the illuminator capable of controlling the intensity of the beam can be used with the lower intensity illumination synchronized with the near-field imager 61 and the higher intensity illumination synchronized with the far-field imager 62. This can also be accomplished by two illuminators, including a wide-beam illuminator 66 and a narrow beam illuminator 68, as shown in FIG. 19. In this embodiment, the wide beam illuminator 66 is synchronized with the near field CCD imager 61, and the narrow beam illuminator 68 is synchronized with the far-field CCD imager 62.

Figure 20:
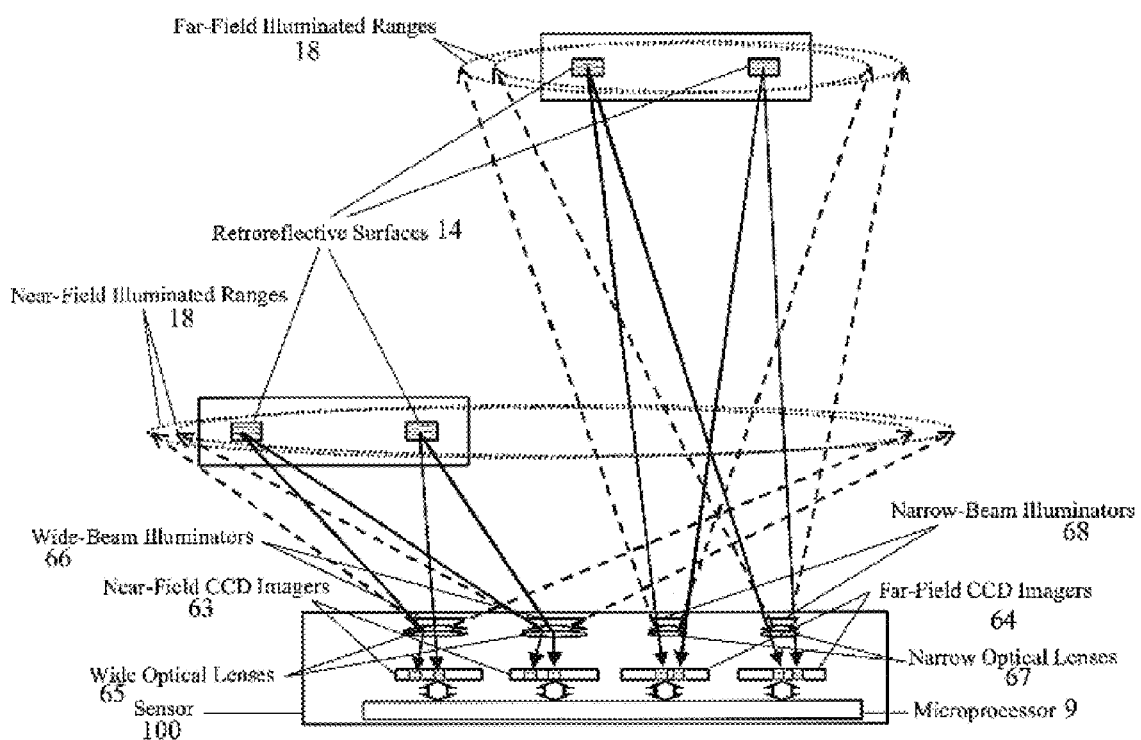
FIG. 20 is a schematic diagram of a fourth embodiment of the invention, IRIS-2.2, where four imagers are used, two with a near-distance field of view and the other two with a far-distance field of view.

FIG. 20 illustrates another modification that can improve ranging accuracy for distant targets using two separate imager pairs 63 and 64. Each imager pair 63 and 64 includes a different optical arrangement: one imager pair such as the near field imagers 63 with a wide-angle lens system 65 having one or more lenses and a wide-beam illuminator 66 for the near field, and the other imager pair with a narrow-angle lens system 67 having one or more lenses and a narrow-beam illuminator 68 for the far field. In this case, the wide beam illuminator is synchronized with the near field imager pair 63 and the narrow beam illuminator is synchronized with the far field imager pair 62.

In both embodiments illustrated in FIGS. 19 and 20, targets 14 that are far away would show up significantly larger on far-field imager 62 or far-field imager pair 64, whose total field of view could be as small as 5° or less, and thus their ranging accuracy would be accordingly improved. Further, targets such as reflective surfaces 14 that are near the host vehicle are tracked using the near-field imager 61 or near-field imager pair 63, whose total field of view could be made as wide as 90° or more. This modification is suitable for both versions that have been discussed thus far, namely for IRIS-1 as well as IRIS-2, resulting in either the IRIS-1.2 configuration, with a total of two imagers, imager 61 for near and imager 62 for far, or the IRIS-2.2 configuration, with a total of four imagers arranged in two pairs separated by a fixed known distance on the host vehicle, imager pair 63 for near and imager pair 64 for far.

The final component of the IRIS-1 prototype is a general-purpose laptop computer, which is used for software development and debugging purposes. The laptop communicates with the camera through its parallel port, and this slows down the data transfer process. In the production version of the invention, this laptop computer would be replaced by a microprocessor connected to the camera via a fast bus. The software that runs on the laptop or the microprocessor processes the data obtained from the camera using standard image processing techniques to produce the distance, azimuth angle, and elevation measurement of each target. In particular, the software can include five different modules:

1. a driver module that activates the illuminator and the imager in the synchronous fashion necessary for the four-step "expose-shift-expose-shift" process;
2. an image acquisition module that transfers the image data from the CCD chip to the laptop and subtracts the illuminator-off image from the illuminator-on image;
3. an object detection module that filters the subtracted image using thresholding and low-pass spatial filtering to remove the remaining noise, detects all targets in the filtered image, and computes their apparent location and size;

4. a ranging module that computes the distance, azimuth angle, and elevation angle of each target; and 5. a tracking module that uses information from previous images to classify targets into objects (such as two taillights and a license plate that belong to the same vehicle) and tracks their motion relative to the host vehicle.

The foregoing functions can also be performed by differently organized software modules, which can combine or separate these functions among the software modules.

Figure 21:
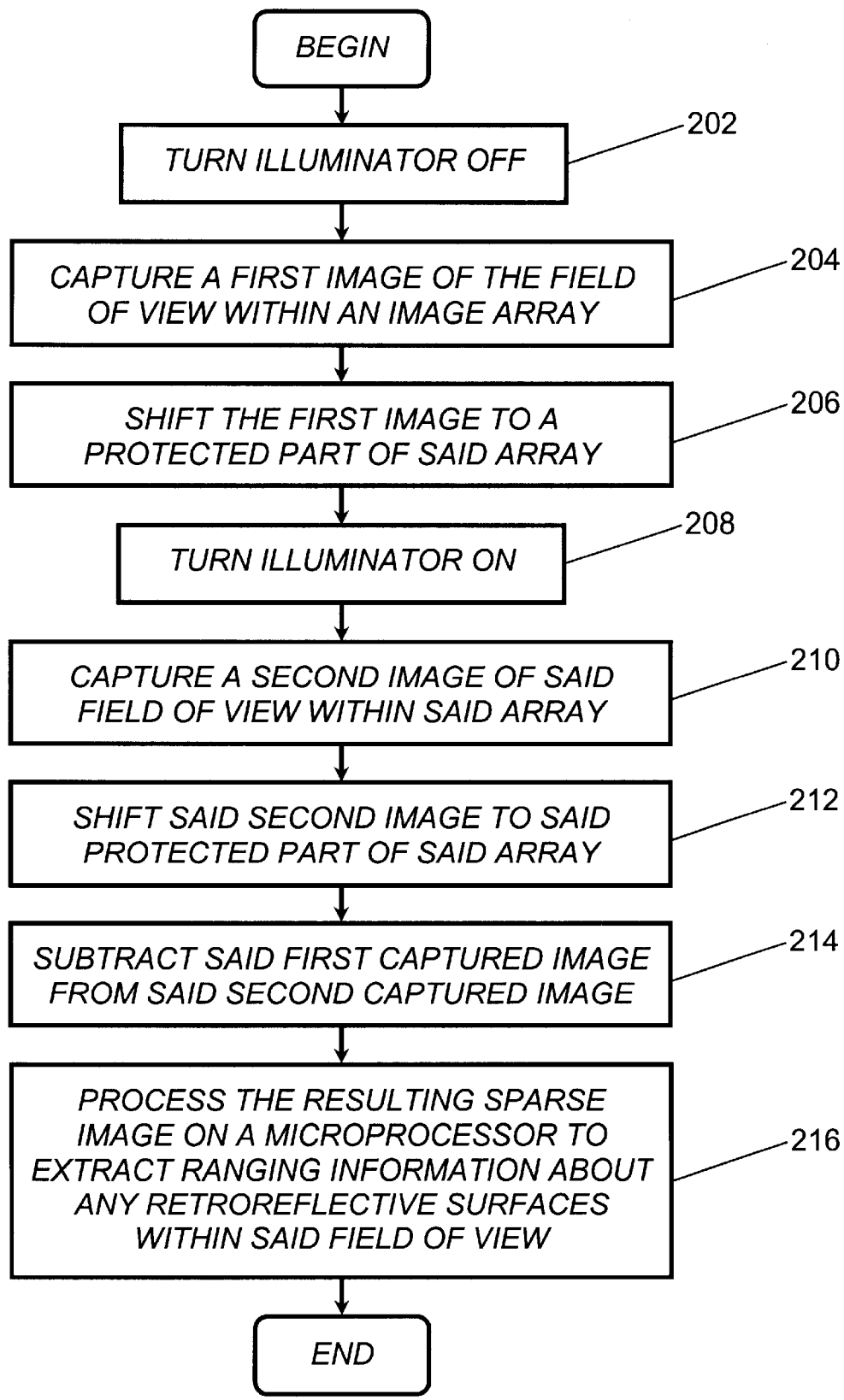
FIG. 21 is a flow chart illustrating exemplary method steps that can be used to practice the present invention.

FIG. 21 is a flow chart illustrating exemplary method steps that can be used to practice the present invention. A field of view which potentially includes a target object is illuminated with an illumination signal. In one embodiment of the invention, the illumination is periodic, however, this need not be the case. For example, aperiodic illumination schemes can be employed wherein the field of view is illuminated according to the speed of the host vehicle or the difference between the speed of host vehicle and objects determined to be in the field of view. The frequency of illumination (and the computations associated with ranging) can also increase as measured data indicates that the target is nearing the host vehicle. Alternatively, the frequency of illumination can be adaptively increased when successive measurements indicate that the range or apparent position of the target is changing at a rate above a fixed or adaptive threshold.

Reflected signals from the field of view are received in synchronization with the illumination signal being turned on and off. The reflected signals include signals in the absence of illumination and with illumination.

As shown in block 202, the field of view is illuminated with an illumination signal. Reflected signals are then synchronously received from the field of view with illumination and in the absence of illumination of the field of view. Signals from the field of view (with and without illumination) are synchronously received from the field of view, as shown in block 204. One of a first image and a second image is captured within an array while the other of the second image and the first image is still captured in the array, wherein the first image includes reflected signals from the field of view with illumination and the second image includes reflected signals in the absence of illumination. This is depicted in block 206. A subtraction image of at least a portion of the field of view is generated, the subtraction image comprising a pixel difference between the first and second images captured in the array. This is depicted in block 208. The sparse image resulting from this subtraction is processed on a microprocessor to extract ranging information about any retroreflective surfaces within the field of view.

Since a subtraction image is the goal of the foregoing process, it does not matter which of the two images, the first (illuminated image) or the second (non-illuminated image) is recorded before the other. Hence, the first (illuminated) image may be captured in the array first and the second (non-illuminated) image may be captured in the array while the first (illuminated) image is still captured in the array, or, the second (non-illuminated) image may be captured in the array first and the first (illuminated) image may be captured in the array while the second (non-illuminated) image is still captured in the array. Hence, the terms "first image" and "second image" as used above are intended only to distinguish the two images from each other, and are not intended to infer any order in which the images are captured or stored.

Compared to the other ranging technologies discussed in the prior art section, ft b the invention has the advantages of much lower production cost ($30–$70 compared to $300–$1000 for the others), much higher accuracy and reliability, and longer operating range (more than 200 m compared to 150 m). More specifically:

Compared to sonar, the invention has similar production cost, much longer operating range (more than 200 m compared to less than 5 m), and much higher accuracy and reliability, but sonar can detect all objects within its short operating range, not just those with retroreflective surfaces on them.

Compared to time-of-flight laser, the invention has lower production cost ($30–$70 compared to $300–$500), longer operating range (more than 200 m compared to about 100 m), higher accuracy and reliability, better ability to track multiple targets at the same time due to its higher resolution, similar detection capabilities (since time-of-flight laser also depends on retroreflective surfaces for its strongest returns), and better operation in poor weather, because its higher resolution and image subtraction process make it less sensitive to returns from water particles.

Compared to millimeter-wave radar, the invention has much lower production cost ($30–$70 compared to $500–$1000), much higher accuracy and reliability for retroreflective targets, better ability to track multiple targets at the same time due to its higher resolution, longer operating range (more than 200 m compared to about 150 m), and much lower sensitivity to similar devices operating in close proximity. On the other hand, due to its longer wavelength, radar has much better operation in poor weather and can detect all objects, not just those with retroreflective surfaces on them.

Compared to computer vision, the invention has lower production cost, mainly because of its significantly reduced computational requirements, better operation at night, since it does not rely on ambient light, better operation in poor weather, due to the image subtraction process, and similar accuracy and ability to track multiple targets, due to its similar resolution. On the other hand, computer vision can detect all objects, not just those with retroreflective surfaces on them, as long as they are adequately illuminated by the ambient light.

Finally, compared to GPS systems, the invention has the major advantage of being able to operate autonomously, since it does not rely on additional infrastructure and does not require other vehicles to be similarly equipped. On the other hand, GPS systems can receive data from all vehicles around them, not just those in the immediate field of view, and with the D-GPS enhancement they can track them all with higher accuracy at longer distances, and most likely at a lower cost per vehicle.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. An apparatus for ranging an object comprising:
    an illuminator to illuminate a field of view potentially including the object;
    an imager to capture a first image having reflected signals from the field of view when the field of view is illuminated by the illuminator and a second image having reflected signals from the field of view when the field of view is not illuminated by the illuminator;
    a circuit coupled to said imager to synchronously control said illuminator and said imager, and to generate a subtraction image of the field of view as the pixel difference between the first image and the second image; and
    wherein the imager captures one of the first image and second image while the other one of the second image and first image is still captured in the imager; and
    wherein said imager comprises an imaging pixel array in which said pixels of said array are organized into a two dimensional array comprising pixel lines forming a first and a second group of pixel lines, said first group of pixel lines being unmasked and said second group of pixel lines being masked to prevent loading of imaged data therein, and wherein a first exposure of said pixel array said circuit loads said first group of pixel lines with a first set of image data associated with the one of the first image and the second image, then shifts said first set of image data into said second group of pixel lines, and wherein a second exposure of said pixel array said circuit loads said first group of pixel lines with a second set of image data associated with the other one of the second image and the first image, and then shifts said second set of image data into said second group of pixel lines, said second set of pixel lines then storing said first and second set sets of image data.

2. The apparatus of claim 1, wherein said illuminator is placed proximate to the imager.

3. The apparatus of claim 2, wherein said illuminator is placed within approximately 5 centimeters of the imager.

4. The apparatus of claim 1, wherein said second group of pixel lines comprises a contiguous subarray of pixel lines including two thirds of said pixel array.

5. The apparatus of claim 4, wherein said pixel array comprises rows and columns of pixels and wherein said contiguous subarray of pixel lines forming said second group of pixel lines forms a block of columns of said pixels.

6. The apparatus of claim 2, wherein said pixel array comprises rows and columns of pixels and wherein said contiguous subarray of pixel lines forming said second group of pixel lines forms a block of rows of said pixels.

7. The apparatus of claim 1, wherein said first group of pixel lines comprises alternating pixel lines in a first half of said pixel array and wherein said second group of pixel lines comprises all remaining pixel lines in said pixel array.

8. The apparatus of claim 7, wherein said pixel array comprises rows and columns of pixels and wherein alternating pixel lines forming said first group of pixel lines forms a set of columns of said pixels.

9. The apparatus of claim 7, wherein said pixel array comprises rows and columns of pixels and wherein alternating pixel lines forming said first group of pixel lines forms a set of rows of said pixels.

10. The apparatus of claim 1, wherein said first group of pixel lines comprises alternating pixels in each line in a first half of said pixel array with each alternating pixel being offset from ones of said alternating pixels in adjacent lines of pixels to form a checkerboard pattern, and wherein said second group of pixel lines comprises all remaining pixel lines in said pixel array.

11. The apparatus of claim 10, wherein said pixel array comprises rows and columns of pixels and wherein alternating pixels forming said checkerboard pattern form a set of columns of said alternating pixels.

12. The apparatus of claim 10, wherein said pixel array comprises rows and columns of pixels and wherein alternating pixels forming said checkerboard pattern form a set of rows of said alternating pixels.

13. The apparatus of claim 1, wherein said first group of pixel lines comprises contiguous pixel lines in a middle third of said pixel array, and wherein said second group of pixel lines comprises all remaining pixel lines in said pixel array.

14. The apparatus of claim 13, wherein said pixel array comprises rows and columns of pixels and wherein middle third of said pixel array forming said first group of pixel lines forms a contiguous block of columns of said pixels.

15. The apparatus of claim 13, wherein said pixel array comprises rows and columns of pixels and wherein middle third of said pixel array forming said first group of pixel lines forms a contiguous block of rows of said pixels.

16. The apparatus of claim 1, wherein said first and second exposure are taken in time sequence without processing said image data between each exposure.

17. The apparatus of claim 1, wherein said first and second images are captured in time sequence separated by a time interval smaller than that which transpires between any substantial change in said first and second images of said field of view.

18. The apparatus of claim 17, wherein said time interval is not greater than approximately 10 milliseconds.

19. The apparatus of claim 1, wherein said circuit further determines distance to said object in said field of view from said imager.

20. The apparatus of claim 19, wherein said circuit determines absolute distance to said object in said field of view from said imager.

21. The apparatus of claim 19, wherein said circuit determines relative changes in distance to said object in said field of view from said imager.

22. The apparatus of claim 1, wherein:

said illuminator provides illumination in a narrow frequency band;

said imager is a camera; and the apparatus further comprises a bandpass filter interposed between said camera and field of view, said bandpass filter being centered on said narrow frequency band of illumination of said illuminator.

23. The apparatus of claim 1, wherein said illuminator is modulated and said imager is locked to said modulation to receive reflected signals according to said modulation.

24. The apparatus of claim 1, wherein said circuit comprises:

a computer having a memory, where said computer is controlled by a driver module to activate said illuminator and said imager synchronously with each other to capture said first and second images;

an image acquisition module to transfer said first and second images from said imager to said circuit;

an object detection module to detect reflective images in said subtraction image; and a ranging module to compute said distance to said object.

25. The apparatus of claim 1, further comprising a second imager coupled to said circuit, wherein the first imager is disposed proximate to the second imager by a fixed predetermined distance.

26. The apparatus of claim 25, wherein the illuminator is disposed proximate to the first imager and the second imager, and the illuminator is synchronized with the first imager and the second imager.

27. The apparatus of claim 25, further comprising a second illuminator, wherein:

the first illuminator is disposed proximate to the first imager and synchronized with the first imager; and the second illuminator is disposed proximate to the second imager and synchronized with the second imager.

28. The apparatus of claim 1, further comprising a second imager coupled to the circuit, wherein:

the first imager has a first imager field of view and the second imager has a second imager field of view narrower than the first imager field of view.

29. The apparatus of claim 28, wherein:

the first illuminator comprises a first illuminator field of view;

the first illuminator is proximate to both the first imager and the second imager; and the first illuminator is synchronized with the first imager and the second imager.

30. The apparatus of claim 28, further comprising a second illuminator, wherein:

the first illuminator comprises a first illuminator field of view and is disposed proximate to the first imager and synchronized with the first imager;

the second imager comprises a second illuminator field of view narrower than the first illuminator field of view and is disposed proximate to the second imager and synchronized with the second imager.

31. A method for ranging comprising:

illuminating a field of view with an illumination signal, which field of view potentially includes an object;

synchronously receiving reflected signals from the field of view with illumination and absence of illumination of the field of view;

capturing one of a first image and a second image within an array while the other one of the second image and the first image is still captured in the array, wherein the first image includes reflected signals from the field of view with illumination and the second image includes reflected signals in the absence of illumination, wherein the array is a pixel array and wherein capturing one of the first image and the second image of the array comprises capturing said first and second images in the pixel array in which said pixels of said pixel array are organized into a two dimensional array comprising pixel lines forming a first and second groups of pixel lines, said first group of pixel lines being unmasked and said second group of pixel lines being masked to prevent loading of imaged data therein, and wherein a first exposure of said pixel array a circuit loads said first group of pixel lines with said one of the first image and the second image, then shifts said one of the first image and the second image into said second group of pixels, and wherein a second exposure of said pixel array said circuit loads said first group of pixel lines with the other one of the second image and the first image, and then shifts said second image into said second group of pixel lines, said second set of pixel lines then storing said first and second images; and generating a subtraction image of at least a portion of said field of view comprising the pixel difference between said first and second images captured in said array.

32. The method of claim 31, wherein said illumination is performed by an illuminator disposed proximate to said array.

33. The method of claim 32, wherein the illumination is performed by an illuminator disposed less than approximately 5 centimeters from the array.

34. The method of claim 31, wherein capturing said first and second images comprises:

capturing said first and second images in said first group of pixel lines which comprises a contiguous subarray of pixel lines including one third of said pixel array, said second group of pixel lines including two thirds of said pixel array.

35. The method of claim 31, wherein said pixel array comprises rows and columns of pixels and wherein capturing said second image comprises:

capturing said second image in said contiguous subarray of pixel lines forming said second group of pixel lines forms a block of columns of said pixels.

36. The method of claim 31, wherein said pixel array comprises rows and columns of pixels and wherein capturing said second image comprises:

capturing said second image in said contiguous subarray of pixel lines forming said second group of pixel lines forms a block of rows of said pixels.

37. The method of claim 31, wherein capturing said first and second images comprises:

capturing each of said first and second images in alternating pixel lines in a first half of said pixel array and wherein said second group of pixel lines comprises all remaining pixel lines in said pixel array.

38. The method of claim 37, wherein said pixel array comprises rows and columns of pixels and where said first and second images captured in alternating pixel lines forming said first group of pixel lines forms a set of columns of said pixels.

39. The method of claim 37, wherein said pixel array comprises rows and columns of pixels and where said first and second images captured in alternating pixel lines forming said first group of pixel lines forms a set of rows of said pixels.

40. The method of claim 31, wherein capturing said first and second images comprises:
   capturing said first and second images in alternating pixels in each line in a first half of said pixel array in said first group of pixel lines with each alternating pixel being offset from ones of said alternating pixels in adjacent lines of pixels to form a checkerboard pattern, and wherein said second group of pixel lines comprises all remaining pixel lines in said pixel array.

41. The method of claim 40, wherein said pixel array comprises rows and columns of pixels and wherein capturing said first and second images comprises:
   capturing said first and second images in alternating pixel lines of said first group of pixel lines which form a set of columns of said alternating pixels.

42. The method of claim 40, wherein said pixel array comprises rows and columns of pixels and wherein capturing said first and second images comprises:
   capturing said first and second images in alternating pixel lines of said first group of pixel lines which form a set of rows of said alternating pixels.

43. The method of claim 31, wherein capturing said first and second images comprises:
   capturing said first and second images in said first group of pixel lines which comprises contiguous pixel lines in a middle third of said pixel array, and wherein said second group of pixel lines comprises all remaining pixel lines in said pixel array.

44. The method of claim 43, wherein said pixel array comprises rows and columns of pixels and wherein:
   capturing said first and second images captures said first and second images in said middle third of said pixel array forms a contiguous block of columns of said pixels.

45. The method of claim 43, wherein said pixel array comprises rows and columns of pixels and wherein:
   capturing said first and second images captures said first and second images in said middle third of said pixel array to form a contiguous block of rows of said pixels.

46. The method of claim 31, wherein capturing said first and second images is performed in time sequence without processing said image data between each capture.

47. The method of claim 31, wherein capturing said first and second images is performed in time sequence separated by a time interval smaller than that which transpires between any substantial change in said first and second images of said field of view.

48. The method of claim 47, wherein said time interval is approximately 10 milliseconds or less.

49. The method of claim 31, further comprising determining distance to said object in said field of view from a following object.

50. The method of claim 49, wherein determining distance determines absolute distance to said object in said field of view from said following object.

51. The method of claim 49, wherein determining distance determines relative changes in distance to said object in said field of view from said following object.

52. The method of claim 49, where illuminating said field of view substantially illuminates said field of view with a narrow band of frequency of light, and further comprises bandpass filtering received reflected signals.

53. The method of claim 31, further comprising modulating said illumination signal and wherein only modulated reflected signals are received.

54. The method of claim 31, further comprising detecting at least two objects in said subtraction image and computing a distance to said object based on configuration of said at least two objects.

55. The method of claim 31, wherein capturing said first and second images is performed by two arrays which are separated from each other at a fixed predetermined distance.

56. The method of claim 55, wherein:
   the illuminator is disposed proximate to the first array and the second array and wherein the illumination is synchronized with the first array and the second array.

57. The method of claim 55, further comprising:
   illuminating a second field of view with a second illumination signal, which second field of view potentially includes the object.

58. The method of claim 57, further comprising:
   synchronously receiving reflected signal from said second field of view with illumination and in absence of illumination of the second field of view;
   capturing a first image of the reflected signal from the second field of view within a second array when the second field of view is illuminated;
   capturing a second image of the reflected signal from the second field of view when the second field of view is not illuminated within the second array; and
   wherein one of the first image and the second image captured in the second array is captured while the other of the second image and the first image captured in the second array is still captured in the second array.

59. The method of 58, wherein the subtraction image is generated from the pixel difference between the first and second images captured in the first array and the pixel difference between the first and second images captured in the second array.

60. The method of claim 31, wherein:
   the first and second images are further captured by a second array wherein the second array has a narrower field of view than the first array.

61. The method of claim 60, wherein:
   the illuminator has a substantially wide field of view, and is placed proximate to the first and the second array, and wherein the illuminator is synchronized with the first and the second array.

62. The method of claim 60, wherein the illumination signal is produced by a first illuminator having a first field of view and wherein the reflected signal from the first field of view is received by a first array synchronized with the first illuminator, and wherein the method further comprises:
   illuminating a second field of view with a second illumination signal produced by a second illuminator, which second field of view potentially includes the object, wherein the second field of view is narrower than the first field of view and wherein the second illuminator is synchronized with a second array;
   synchronously receiving the reflected signal from said second field of view with illumination and in the absence of illumination of the second field of view with the second array;
   capturing the first image of the reflected signal from the second field of view within the second array when the second field of view is illuminated;

capturing the second image of the reflected signal from the second field of view when the second field of view is not illuminated within the second array; and wherein one of the first image and the second image captured in the second array is captured while the other of the second image and the first image captured in the second array is still captured in the second array.

63. The method of claim 62, further comprising:

generating a subtraction image of at least a portion of the second field of view comprising the pixel difference between the first and second images captured in the second array.

64. A program storage device, readable by a computer, tangibly at least one program of instructions executable by the computer to perform method ranging, the method steps comprising the steps of:

illuminating a field of view with an illumination signal, which field of view potentially includes an object;

synchronously receiving reflected signals from the field of view with illumination and absence of illumination of the field of view;

capturing one of a first image and a second image within an array while the other one of the second image and the first image is still captured in the array, wherein the first image includes reflected signals from the field of view with illumination and the second image includes reflected signals in the absence of illumination, wherein capturing one of the first image and the second image of the array comprises capturing said first and second images in an imaging pixel array in which said pixels of said array are organized into a two dimensional array comprising pixel lines forming a first and second groups of pixel lines, said first group of pixel lines being unmasked and said second group of pixel lines being masked to prevent loading of imaged data therein, and wherein a first exposure of said pixel array a circuit loads said first group of pixel lines with said one of the first image and the second image, then shifts said one of the first image and the second image into said second group of pixels, and wherein a second exposure of said pixel array said circuit loads said first group of pixel lines with the other one of the second image and the first image, and then shifts said second image into said second group of pixel lines, said second set of pixel lines then storing said first and second images; and generating a subtraction image of at least a portion of said field of view comprising the pixel difference between said first and second images captured in said array.

* * * * *